United States Patent [19]
Yagishita et al.

[11] Patent Number: 6,036,251
[45] Date of Patent: *Mar. 14, 2000

[54] ENERGY ABSORBING DOOR PANEL

[75] Inventors: Fumio Yagishita; Kazushi Yasue, both of Samukawa-machi; Nobuhiko Takahashi, Yokohama; Akira Kawai, Minamiashigara, all of Japan

[73] Assignees: Kasai Kogyo Kabushiki Kaisha, Kanagawa-ken, Japan; Nissan Motor Co., Ltd., Yokohama, Japan

[ * ] Notice: This patent is subject to a terminal disclaimer.

[21] Appl. No.: 09/332,151

[22] Filed: Jun. 14, 1999

Related U.S. Application Data

[63] Continuation of application No. 08/929,348, Aug. 25, 1997, which is a continuation of application No. 08/496,011, Jun. 28, 1995, abandoned.

[30] Foreign Application Priority Data

| Jul. 1, 1994 | [JP] | Japan | 6-150805 |
| Jul. 1, 1994 | [JP] | Japan | 6-151044 |
| Jul. 1, 1994 | [JP] | Japan | 6-151088 |
| Jul. 1, 1998 | [JP] | Japan | 6-150808 |

[51] Int. Cl.$^7$ .................................................. B60R 13/01
[52] U.S. Cl. .................. 296/39.1; 296/39.2; 296/146.6; 280/751
[58] Field of Search .................... 296/39.1, 39.2, 296/146.6, 146, 146 D; 280/751; 49/502; 267/1

[56] References Cited

U.S. PATENT DOCUMENTS

| 3,503,600 | 3/1970 | Rich | 267/1 |
| 3,989,275 | 11/1976 | Finch et al. | 280/751 |
| 4,890,877 | 1/1990 | Ahstiani-Zarandi et al. | 296/146 |
| 5,040,335 | 8/1991 | Grimes | 49/502 |
| 5,098,124 | 3/1992 | Breed et al. | 280/751 |
| 5,131,709 | 7/1992 | Spica | 296/39.2 |
| 5,141,279 | 8/1992 | Weller | 296/146 |
| 5,145,445 | 9/1992 | Weller | 280/751 |
| 5,306,066 | 4/1994 | Saathoff | 296/146.6 |
| 5,433,478 | 7/1995 | Naruse | 280/751 |
| 5,573,272 | 11/1996 | Teshima | 280/751 |

*Primary Examiner*—Joseph D. Pape
*Assistant Examiner*—Kiran Patel
*Attorney, Agent, or Firm*—Foley & Lardner

[57] ABSTRACT

A car trim including a plurality of ribs formed integrally and arranged vertically at a predetermined interval on a predetermined site of the rear face 1a of trim main body 1 for absorbing energy of collision, each rib being formed in a rectangular tube, each rib side wall 4a being tapered with thinning toward its distal end, and a rigidity changing portion P being disposed by integrally forming an auxiliary rib piece 5 on the rib side wall 4a for introducing buckling transformation of the rib 4 at a predetemined position in the rib side wall 4a. The rib also includes a first energy absorbing portion 5 and a second energy absorbing portion 6 formed in such a multi-stepped manner that the number of rib walls in the former step is different from that number in the latter step. Further, the rib also includes a first auxiliary rib piece 5 extending outside from each corner along one side wall 3, 4 of the rib and a second auxiliary rib piece 6 extending from the distal end of the first auxiliary rib piece 5 onto the other side wall 4, 3 vertically intersecting that first auxiliary rib piece.

18 Claims, 16 Drawing Sheets

STROKE OF TRANSFORMATION

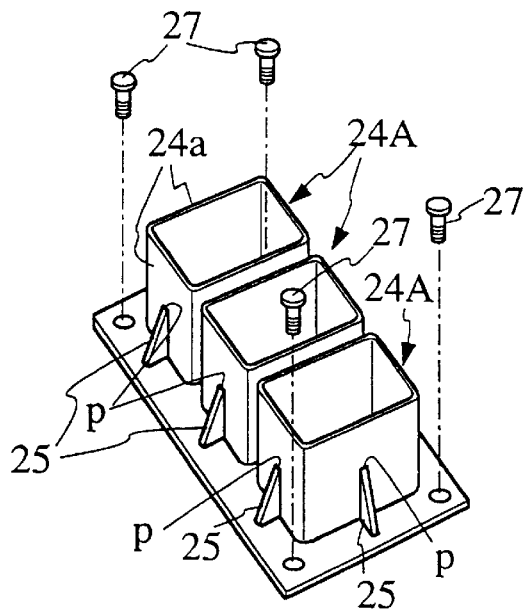
FIG. 16
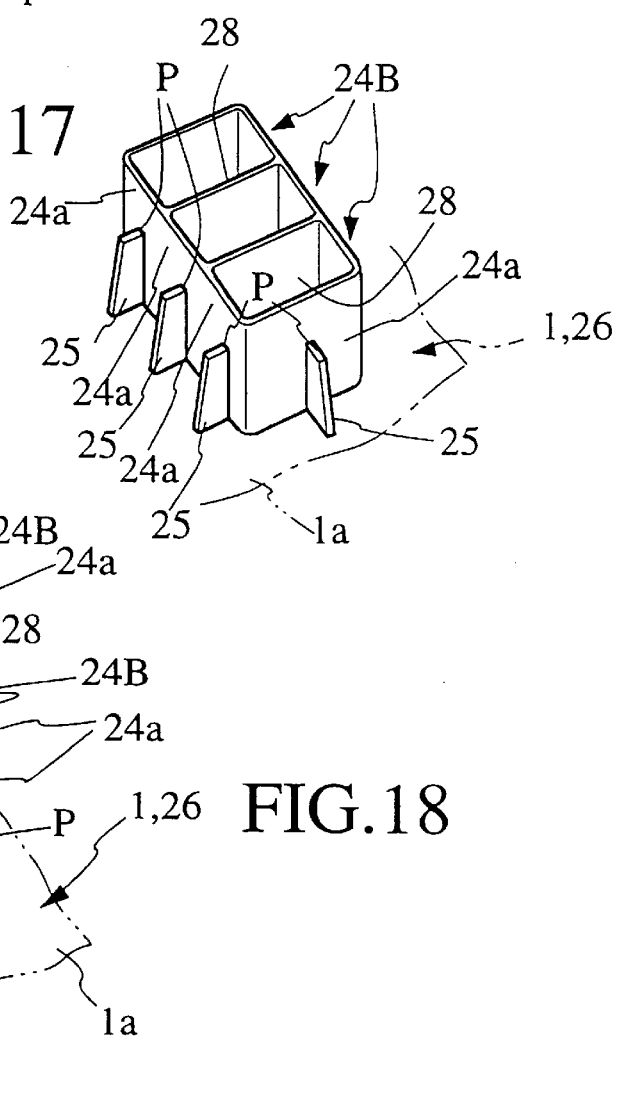
FIG. 17
FIG. 18
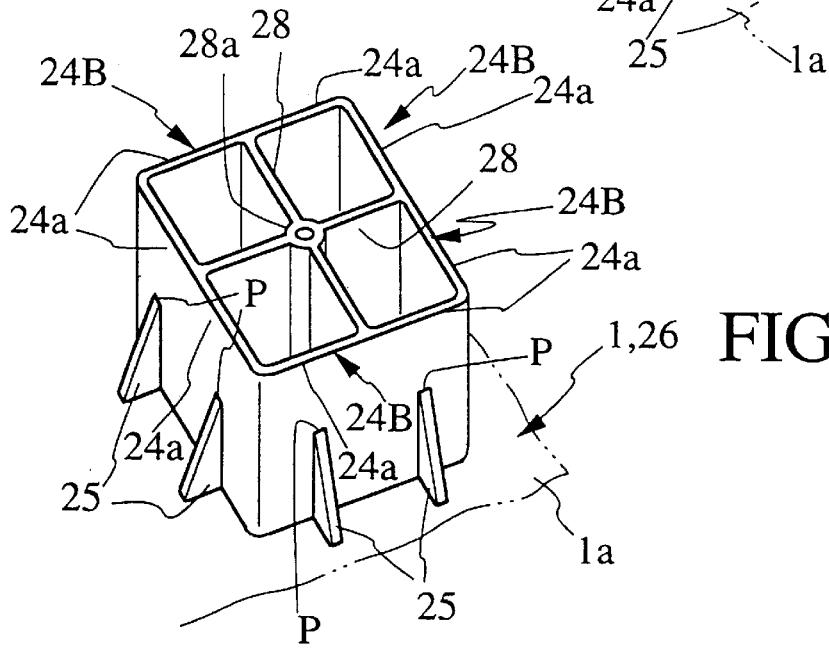

ENERGY ABSORBING DOOR PANEL

This APPLN is a Con of 08/929,348 filed Aug. 25, 1997 which is a Con of 08/496,011 filed Jun. 28, 1995 now abandoned.

BACKGROUND OF THE INVENTION

1. Technical Field

This invention relates to a car trim which is attached to and decorates a panel face of the car compartment side portion, such as door inner panel or rear side inner panel.

2. Description of the related art

Japanese Published Unexamined Utility Model Application No. 2-64422 discloses a car trim in which an energy absorbing portion having a honeycomb structure is provided with the rear face of the trim main body as a countermeasure for side collision. In such construction, when the car driver is moved toward the compartment side portion by the force of inertia on a side collision, the honeycomb energy absorbing portion is transformed with buckling to absorb the energy of collision for protecting the driver.

Since this energy absorbing portion comprises a honeycomb structure, when formed with a resinous material, it is difficult to release the formed article from the mold in either case of integral forming with the trim main body or separated forming, thereby to degrade the moldability.

In addition, the honeycomb structure of this energy absorbing portion generally provides relatively large initial counterforce on the buckling transformation so that it is difficult to obtain a tranformation mode of ideally low counterforce from such structure.

Furthermore, when the honeycomb structure is formed with a resin, it is necessary to form each partition wall relatively thick in the light of its moldability. Therefore, in order to reduce the initial counterforce on the buckling transformation as low as possible, it is necessary to increace the distance of projection from the rear face of the trim main body. As a result, the compartment space becomes narrow, and the weight of the trim is increased contrary to the general purpose for reducing the entire weight of the car body.

SUMMARY OF THE INVENTION

It is an object of this invention to provide a car trim including a collision energy absorbing rib for presenting excellent moldability and an ideal transformation mode in which the initial counterforce on the buckling transformation is significantly low.

The above object can be achieved according to the present invention with an energy absorbing car trim adapted for attaching to a panel face of a side portion of a car compartment adjacent to a driver or passenger seat. The trim comprises a trim main body. The main body has a plurality of rectangularly-shaped tubular ribs integral with the trim body and spaced apart at a predetermined interval. Each side wall of each rib has a rigidity changing portion at a location corresponding to a half wavelength of buckling waveform of each rib, between a distal end of each rib and a base of each rib to introduce controlled buckling transformation for the ribs.

In this construction, when the driver is moved toward the compartment side portion by the force of inertia and his or her body hits on the trim main body on a side collision or the like case, the rectangular tubular ribs are is transformed with buckling between the trim main body and the car panel to absorb the energy of collision.

In this case, the rectangular tubular ribs are for absorbing the energy of collision effect to smoothly perform the bellows-type buckling transformation so that the initial counterforce on that transformation can be significantly reduced.

In addition to the advantage on that collision energy absorbing property, since each of the ribs is formed in a rectangular tube, the release from the mold on forming the rib with a resin can be facilitated thereby to enhance the moldability.

The smooth buckling transformation realized by this rib further assures a sufficient effective stroke of transformation. Thus, the distance of projection from the rear face of the trim main body can be reduced as compared to the above-mentioned prior art, thereby guaranteeing a relatively wide compartment space.

In this construction, when the driver is moved toward the compartment side portion by the force of inertia and his or her body hits on the trim main body on a side collision or the like case, the rectangular tubular ribs can be transformed with buckling between the trim main body and the car panel to absorb the energy of collision. The buckling transformation is caused by the rigidity changing portion formed along the rib side wall for smoothly performing it in a bellows manner. Thus, the initial counterforce on that transformation can be much reduced with stabilizing the buckling transformation property.

Alternatively, in this invention, the rectangular tubular ribs can be integrally formed with the rear side of the trim main body. Accordingly, the number of parts can be lowered for the cost reduction.

Alternatively, in this invention, the rectangular tubular ribs can be is integrally formed with a base plate and fixed to the trim main body through the base plate.

Further, in this invention, since the plurality of ribs are arranged at a suitable interval, mutual interference does not occur on the bellows-type buckling transformation. Smooth buckling transformation realized by each rib assures a sufficient effective stroke of transformation.

In addition, since the buckling transformation mode can be changed for each rib, suitable adjustment can be performed to obtain an optimum collision energy absorption property.

Alternatively, in this invention, each of the plurality of rectangular tubular ribs can be is provided with a partition wall integrally formed between one opposed pair of the side walls of the rib. Accordingly, it is advantageous in forming and arranging a plurality of ribs on a predetermined portion of the rear face of the trim main body.

Alternatively, in this invention, each of the plurality of rectangular tubular ribs can be is provided with partition walls vertically intersecting each other and integrally formed between each opposed pair of the side walls of the rib. Accordingly, it is advantageous in forming a plurality of ribs on a predetermined portion of the rear face of the trim main body.

Accordingly, it is advantageous in forming and arranging a plurality of ribs both in the vertical and horizontal directions on a predetermined portion of the rear face of the trim main body.

Alternatively, in this invention, each side wall of the rectangular tubular ribs can be is tapered along its base (where the rib is attached to the trim main body to the distal free end.

Accordingly, the draw angle is provided with the rib so that the moldability can be much enhanced.

Further, since the buckling starts at the distal end thinner than the base portion on the transformation of the rib, thereby lowering the initial counterforce and obtaining a non-linear ideal transformation mode.

Alternatively, in this invention, the height (vertical) to width (horizontal) ratio is set at 0.2 to 1.0.

Alternatively, in this invention, the maximum value of the depth or length (horizontal) of the rectangular rib is set at 70 mm ($\leq 70$ mm), which is-obtained as the optimum value from experiments on the collision energy absorption property and the layout characteristics in case of collective arrangement of the plurality of ribs.

Accordingly, both the initiation and the entirety of bellows-like buckling transformation of the rib are performed smoothly so that the collision energy absorption effect can be much enhanced.

Accordingly, the working range of the rigidity changing portion along the rib side wall can be clearly defined by such an auxiliary rib piece so that the buckling transformation can be introduced with more certainty by the rigidity changing portion.

Further, since the auxiliary rib piece is also transformed on the buckling transformation of the rib, the collision energy absorption effect can be much enhanced.

Alternatively, in this invention, the auxiliary rib piece is integrally formed with the inner surface of the rib side wall.

Accordingly, the auxiliary rib piece does not interfere with the attachment work of the rib to the rear face of the trim main body. This is advantageous both in the space efficiency and in the layout characteristics.

Alternatively, in this invention, the rigidity changing portion is formed by providing an opening in each rib side wall.

Accordingly, such easy formation leads to lowering the cost.

Alternatively, in this invention, a slit is formed near the base end of each rib side wall.

Accordingly, the rigidity near the relatively thick base end of the rib side wall can be adjustably reduced by the slit so that the entire buckling transformation of the rib can be performed more smoothly.

Alternatively, in this invention, the plurality of ribs are divided into two portions, first and second energy absorption sites.

In such construction, when the driver is moved toward the compartment side portion by the force of inertia and his or her body hits on the trim main body on a side collision or the like case, the rib structure provides buckling transformation between the trim main body and the car panel to absorb the energy of collision.

In that case, since each rib for absorbing the collision energy is basically formed into a rectangular tube, the bellows-like buckling transformation can be performed smoothly, thereby to reduce the initial counterforce on the transformation.

Further, since the plurality of ribs are divided into the first and second energy absorption sites, the amount of absorbing the collision energy can be suitably adjusted, thereby obtaining the optimum collision energy absorption property.

In addition to the advantage on that collision energy absorption property, the shape of the rectangular tube rib facilitates the release from the mold on forming it with a resin, thereby enhancing the moldability.

The smooth buckling transformation realized by this rib structure further assures a sufficient effective stroke of transformation. Thus, the distance of projection from the rear face of the trim main body can be desiredly reduced so as to guarantee a relatively wide compartment space.

Alternatively, in this invention, the first and second energy absorption sites of the rib structure are formed separately and connected to each other along the projecting direction. Accordingly, the moldability can be much enhanced, and the collision energy absorption amount by the rib can be adjusted with ease.

Alternatively, in this invention, a rib formed in a rectangular tube for absorbing energy of collision is provided on the rear face of the trim main body which is attached to and decorates a panel face of the car compartment side portion, and a first auxiliary rib piece extending outside the rib along each rib side wall and a second auxiliary rib piece extending from the distal end of each first rib piece to a predetermined intermediate portion of each rib side wall vertical to that first rib piece are integrally formed with the rib.

Accordingly, when the driver is moved toward the compartment side portion by the force of inertia and his or her body hits on the trim main body on a side collision or the like case, the rectangular tube rib is transformed with buckling between the trim main body and the car panel to absorb the energy of collision.

In that case, when the impact of collision is applied along the structural axis of the rib, the bellows-like buckling transformation of the rib is performed smoothly to suppress the initial counterforce on the transformation. Additionally, the first and second rib pieces are also transformed with buckling to absorb the collision energy.

When the impact of collision is applied obliquely, each rib side wall substantially vertical to the applied impact direction tends to fall. However, each of the first and second rib pieces extending along the applied impact direction supports such a rib side wall, thereby performing such buckling transformation that can suitably absorb the energy of collision.

In addition to that advantage on the collision energy absorption property, the shape of the rectangular tube rib facilitates the release from the mold on forming it with a resin, thereby enhancing the moldability.

Further, the smooth buckling transformation due to this rib further assures a sufficient effective stroke of transformation. Thus, the distance of projection from the rear face of the trim main body can be reduced to assure a desiredly wide compartment space.

BRIEF DESCRIPTION OF THE DRAWING

FIG. 16 is a perspective view showing an embodiment in which a plurality of ribs are formed separately from the trim main body.

FIG. 17 is a perspective view showing an embodiment in which each adjacent pair of ribs are connected with a common side wall.

FIG. 18 is a perspective view showing an embodiment in which the rib structure has internal partition walls vertically intersecting each other.

DESCRIPTION OF THE PREFERRED EMBODIMENT

Figure 1:
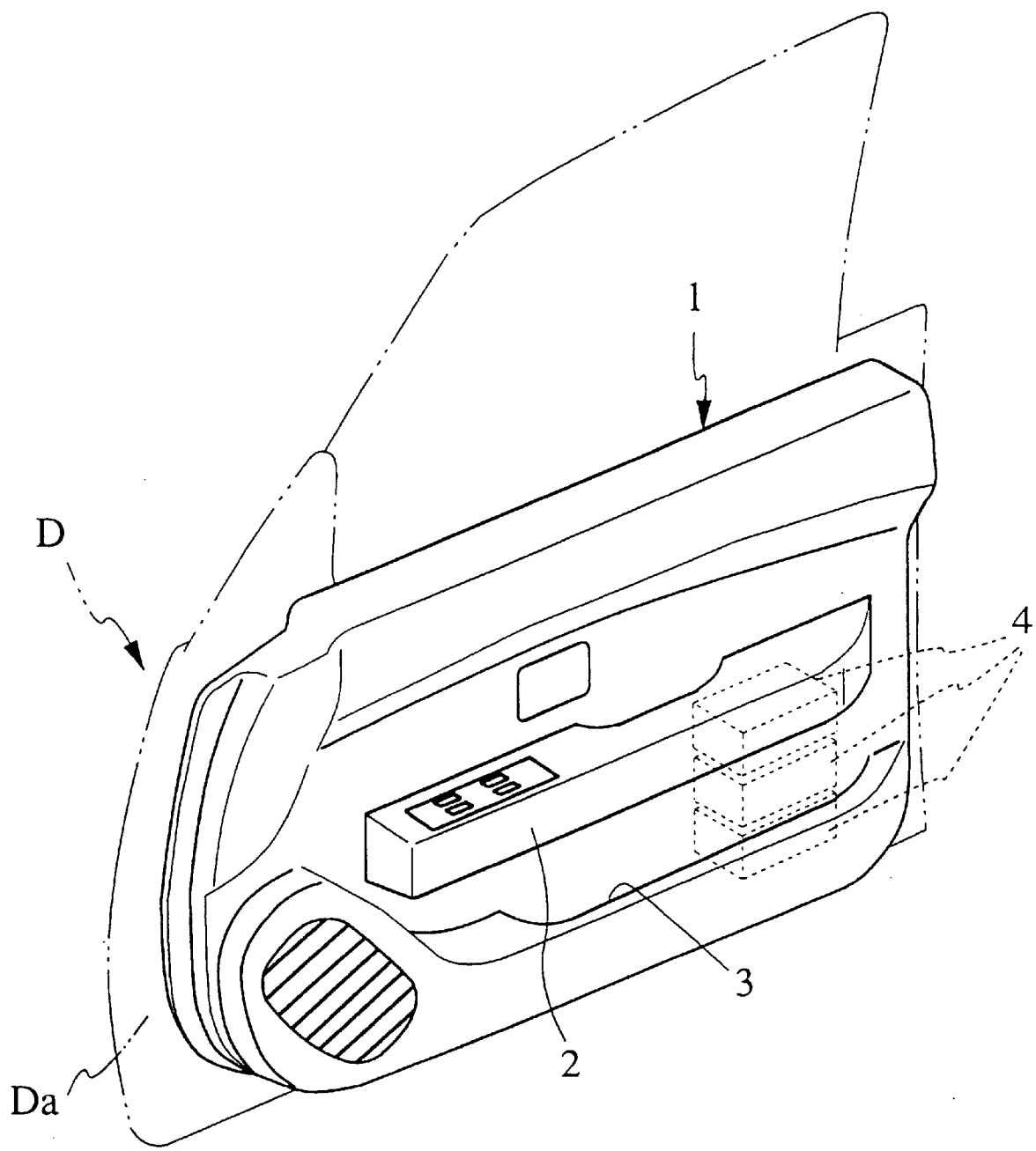
FIG. 1 is a perspective view of a first embodiment of the present invention.

Hereinafter, a door trim as the first embodiment of this invention will be described in detail with reference to the drawing.

Figure 2:
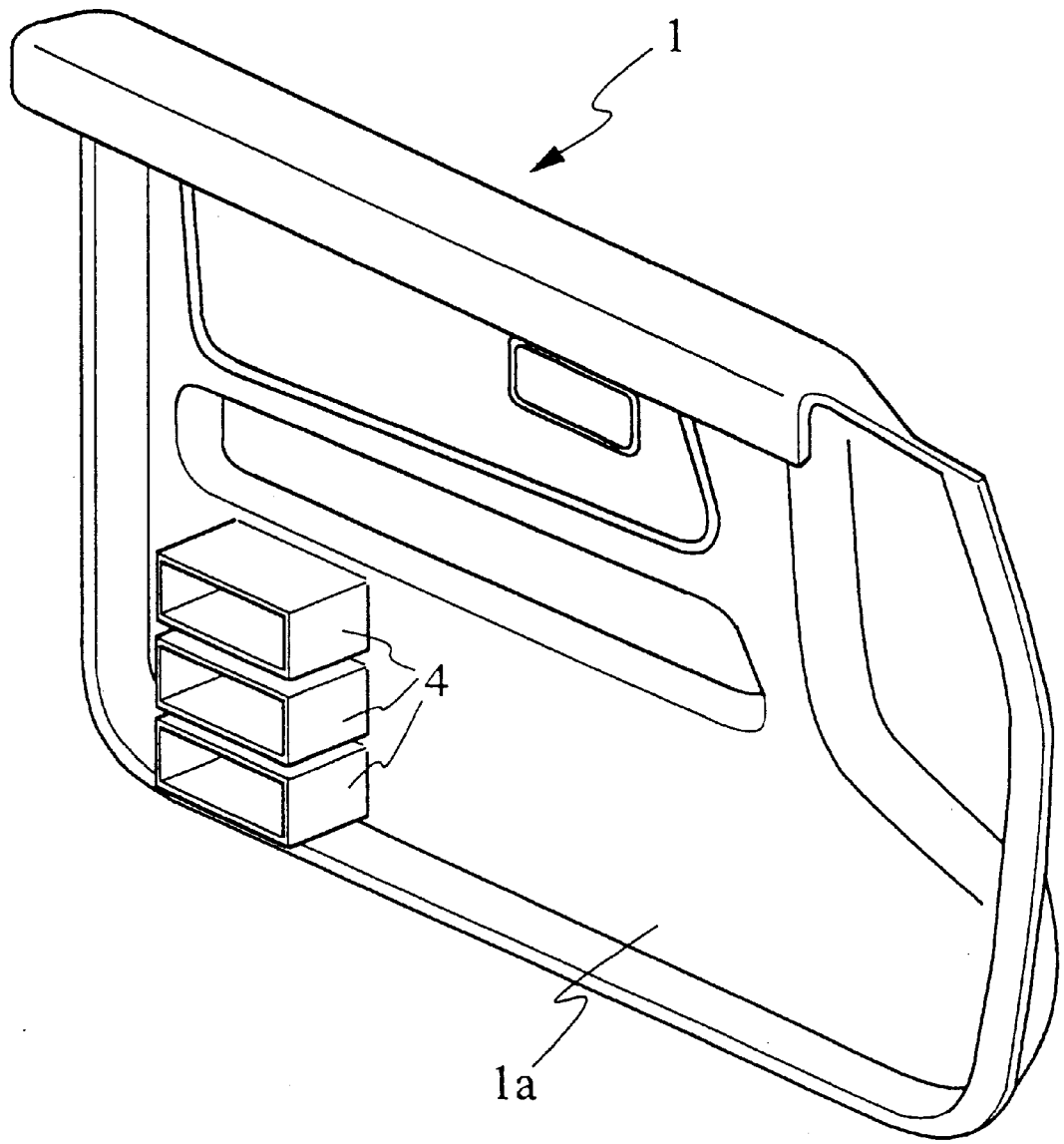
FIG. 2 is a perspective view showing the rear side of the trim main body of the embodiment shown in FIG. 1.
Figure 3:
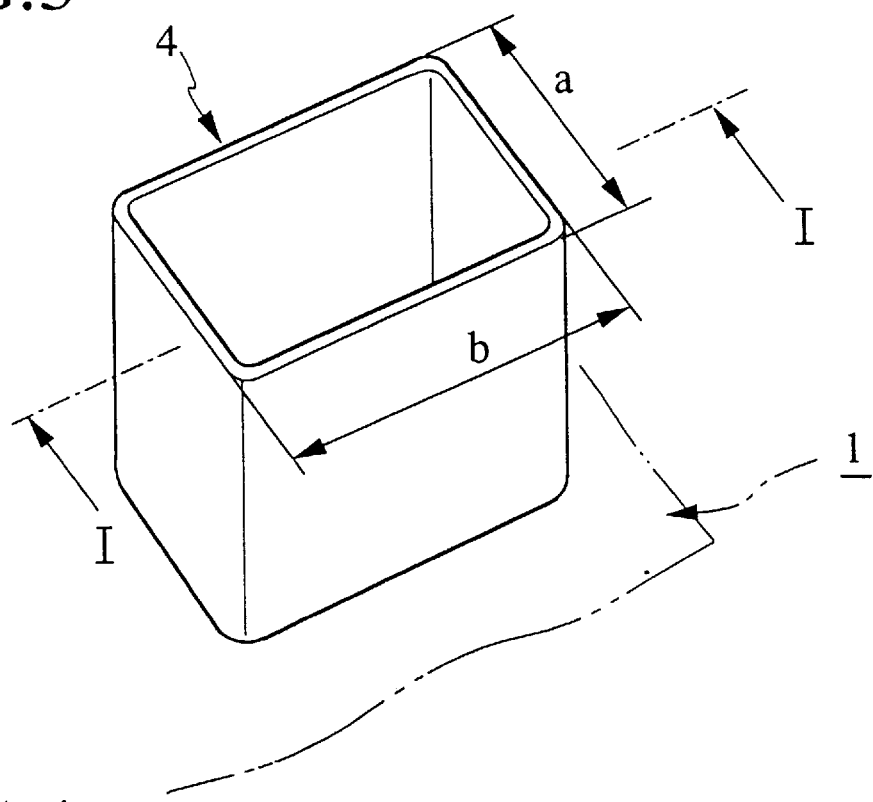
FIG. 3 is a perspective view showing a single rib to be provided on the rear side of the trim main body of the embodiment shown in FIG. 1.

In FIGS. 1 to 3, reference numeral 1 designates a trim main body attached to door inner panel Da of door main body D with a clip or the like means (not shown). In substantially the intermediate portion, arm rest 2 is formed projecting toward the compartment. Further, pocket 3 is provided at the bottom portion.

On the rear face 1a of the trim main body, a plurality ribs 4 formed each in a rectangular tube are provided to absorb energy of collision. Further, the rectangular tube rib is elongated horizontally as is seen from FIG. 2.

In this embodiment, three ribs are integrally formed with trim main body on its rear face 1a in a vertical arrangement at a predetermined interval. The location of these ribs is determined as a site which is the likeliest area to receive load when the driver will be moved aside from his or her seat (not shown) by the inertia force generated by a side collision or the like cause. Namely, the location corresponds to the waist of the driver sitting on the seat.

Figure 4:
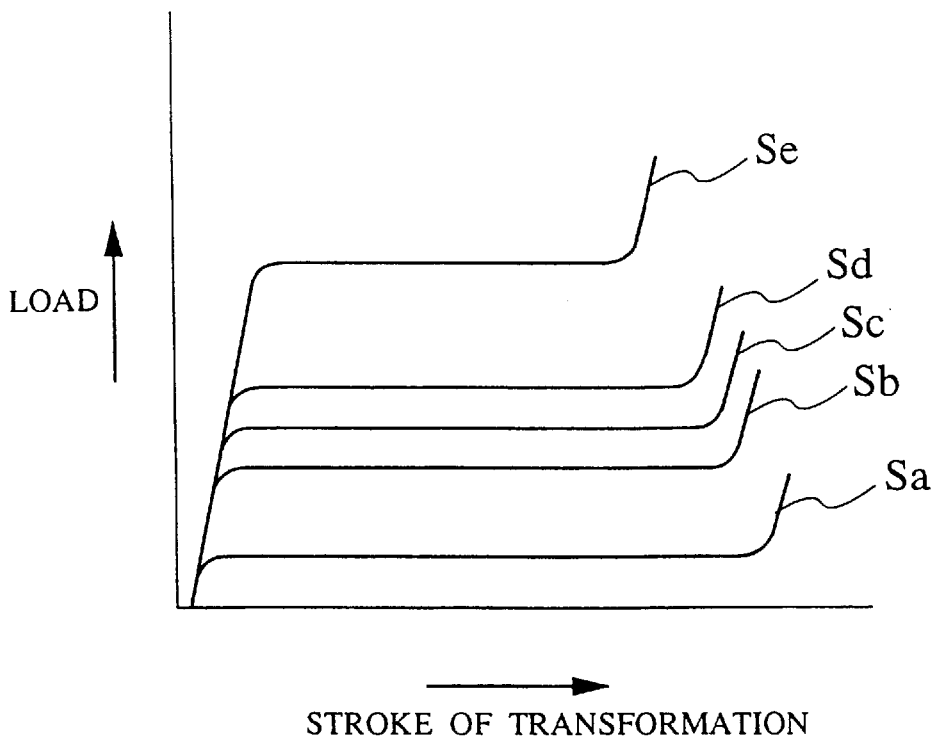
FIG. 4 is a diagram showing the collision energy absorption property of the single rib in the embodiment shown in FIG. 1.

The collision energy absorption property varies with the ratio between the vertical dimension height a and the horizontal width b of the rectangle of each rib 4. For example, when the ratio a/b is set at 0.2, 0.4, 0.6, 0.8, 1.0 in case of rib 4 having the maximum thickness of 2 mm which is substantially the same as the thickness of the trim main body 1, that property corresponds to lines Sa, Sb, Sc, Sd, Se respectively as shown in FIG. 4. When the ratio a/b is smaller than 0.2, the amount of collision energy absorption can not reach a desired range. On the other hand, when the ratio a/b is larger than 1.0, the initial counterforce exceeds a desired level.

Therefore, the ratio between the vertical and horizontal dimensions a/b of the rib 4 is set in the range of from 0.2 to 1.0 in this embodiment. In addition, the depth of projection of the rib 4 from the trim main body 1 is 50 mm, and the the thickness of a top end of the rib 4 is set at 1 to 1.2 mm.

When the maximum value of the depth of vertical and horizontal dimensions a and b exceeds 70 mm, the space to be occupied by the ribs 4 becomes unnecessarily large to degrade the efficiency of absorbing the collision energy. Therefore, that maximum value of a and b is set at 70 mm or less.

Accordingly, when the driver is moved toward the side portion of the compartment by the inertia force on a side collision or the like case and the driver's waist hits on the trim main body effecting the load of collision onto these ribs 4, each rib 4 is transformed with buckling between the trim main body 1 and door inner panel Da to absorb the collision energy.

Especially, in this embodiment, since these ribs 4 are formed in a rectangular tube and vertically arranged at a predetermined interval in the area to be hit by the driver's waist, each rib 4 can perform independent and smooth bellows-like buckling transformation, thereby to desirably reduce the initial counterforce on the transformation and absorb the collision energy with high efficiency.

Additionally, since the smooth buckling transformation performed by each rib 4 can assure a sufficient effective stroke, the height of projection from the rear face of the trim main body 1 can be reduced, thereby keeping a wide compartment space.

Further, the shape of rectangular tube rib 4 facilitates the release from the mold on forming it with a resin. Therefore, the moldability can be enhanced to reduce the manufacturing cost.

Figure 5:
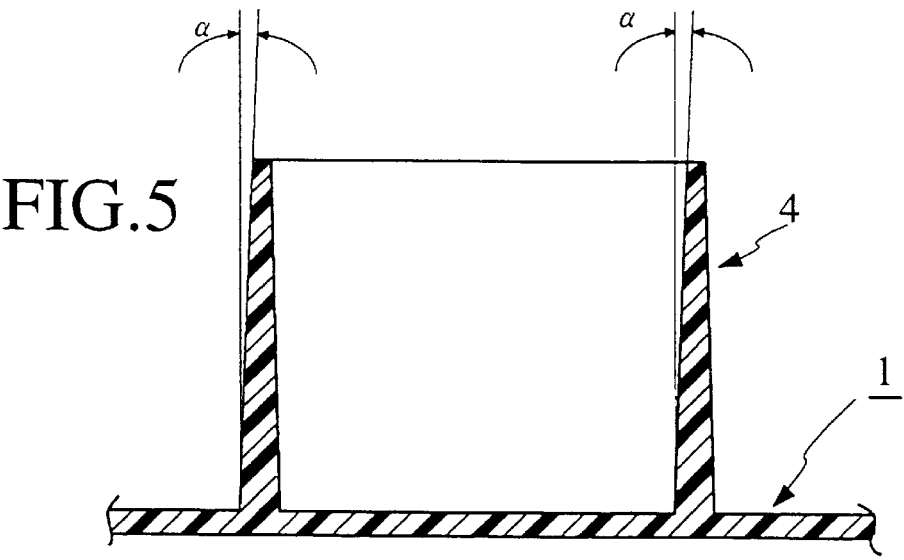
FIG. 5 is a cross-section taken along the line I—I of FIG. 3.

As shown in FIG. 5, if the side wall of the rib 4 is tapered with thinning toward its distal end, a suitable draw angle α of the mold for forming the rib 4 can be obtained. Thus, the moldability can be much enhanced by such construction.

In case of such a tapered shape of the rib 4, it also becomes possible to reduce the initial counterforce and perform smooth buckling transformation because that buckling is initiated from the thinning distal portion of the rib 4. Therefore, a non-linear ideal transformation mode can be realized.

Figure 6:
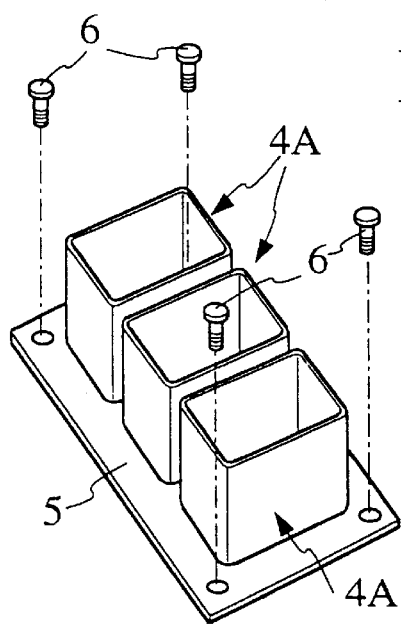
FIG. 6 is a perspective view showing an embodiment in which the rib structure is formed separately from the trim main body.

In the above-mentioned embodiment, the plurality of ribs 4 are integrally formed with the rear face of the trim main body 1. However, as shown in FIG. 6, these ribs may be formed separately from the trim main body 1 and fixed to the rear face of the trim main body 1 through a base plate 5 with screws 6.

In this embodiment, since the trim main body 1 and the ribs 4A are separated, the trim main body can be used in either application equipped or not equipped with the ribs.

Figure 7:
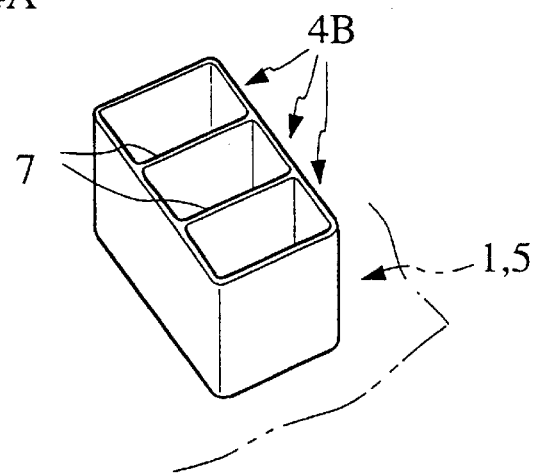
FIG. 7 is a perspective view showing an embodiment in which each adjacent pair of ribs are connected with a common side wall.
Figure 8:
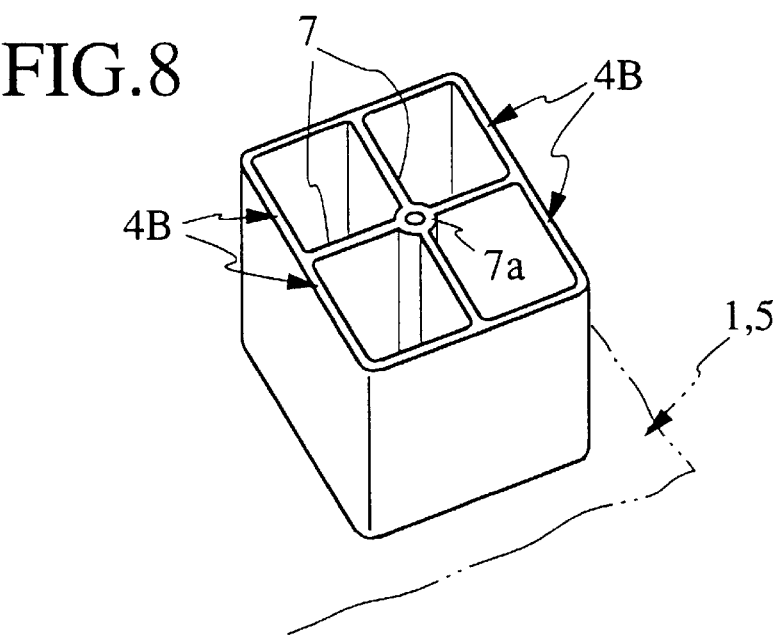
FIG. 8 is a perspective view showing an embodiment in which the rib structure has internal partition walls vertically intersecting each other.

FIGS. 7 and 8 show two embodiments in either of which a plurality of triangular tube ribs 4B are integrally formed in contact with each other. Similarly, in these embodiments, the ratio and the maximum value of the vertical and horizontal dimensions of each rib are set at the respective ranges desribed above with reference to FIG. 3.

In the embodiment shown in FIG. 7, partition walls 7, 7 are integrally formed with and between a pair of side walls, and three continuous ribs 4B are arranged vertically.

In this embodiment, since each ajacent pair of these ribs 4B commonly use the partition wall 7, 7, the absorption amount of collision energy is more reduced as compared to the embodiment shown in FIGS. 1 and 2. However, the design of the forming mold and the release from the mold can be more facilitated on arranging the plurality of ribs at a predetermined area on the rear face of the trim main body 1.

In the embodiment shown in FIG. 8, the partition walls 7, 7 vertically intersecting each other are integrally formed with and between each facing pair of the outer side walls to define four gathering ribs 4B.

At the intersecting point of these partition walls 7, 7, a round boss 7a is formed to facilitate the release from the mold.

Similar to the embodiment of FIG. 7, since each ajacent pair of these ribs 4B commonly use the partition wall 7, 7, the absorption amount of collision energy is more reduced as compared to the embodiment shown in FIGS. 1 and 2. However, it becomes easier to form and arrange such a plurality of ribs 4B contacting with each other as shown in FIG. 8 at a predetermined area on the rear face of the trim main body 1.

Next, the second embodiment of the present invention is described. In the following description, like reference numerals designate like parts of the first embodiment, respectively.

FIGS. 9 to 12 show rib 24 formed on the rear face 1a of trim main body 1, respectively.

In this embodiment, each side wall 24a of rib 24 is tapered with thinning toward its distal end to define a draw angle $\alpha$ of the mold (not shown) around its outer circumference.

Additionally, rigidity changing portion P is provided on each rib side wall 24 at a predetermined location from its distal end for introducing buckling transformation of the rib 24.

Figure 12:
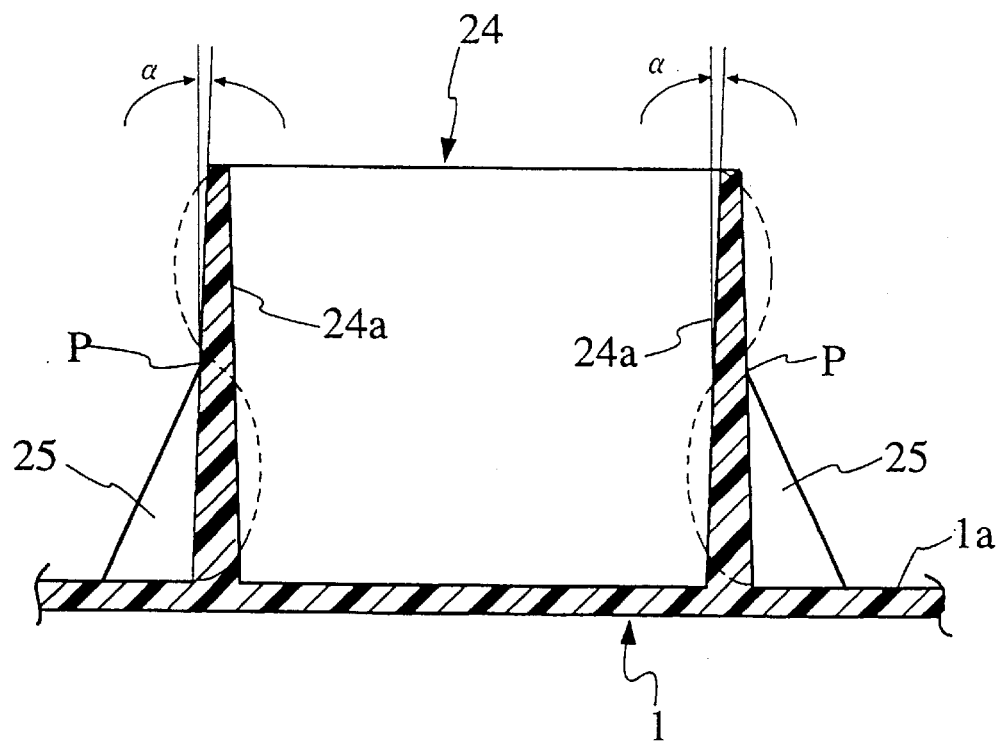
FIG. 12 is a cross-section taken along the line II—II of FIG. 11.

The buckling waveform of the rectangular tube rib 24 can be designated by a dotted line as shown in FIG. 12 When the vertical dimension is a and horizontal dimension is b in the rectangular tube rib 24, the half wavelength of the buckling transformation of rib 24 can be obtained as $(a+b)/4 \pm (a+b)/8$. Therefore, it is preferred for introducing proper buckling transformation to position the rigidity changing portion P at the place corresponding to the half wavelength.

Accordingly, in this embodiment, the rigidity changing portion P is provided at the location corresponding to the half wavelength of the buckling waveform of each rib side wall 24a or to $(a+b)/4 \pm (a+b)/8$ from its distal end.

Various shapes may be applied to the rigidity changing portion P. In this embodiment, triangular rib piece 25 with a height from the base portion to the location corresponding to the half wavelength of the buckling waveform is integrally formed at substantially the central portion of the outer face of each rib side wall 24a.

The collision energy absorption property obtained by this embodiment is similar to the result from the first embodiment. Namely, as shown in FIG. 4, the energy absorption property can be designated by lines Sa, Sb, Sc, Sd and Se when the ratio a/b of the vertical and horizontal dimensions of the rectangular tube rib 24 with a thickness of 2 mm which is substantially the same as the trim main body is set at 0.2, 0.4, 0.6, 0.8 and 1.0. When the ratio a/b is smaller than 0.2, the amount of collision energy absorption can not reach a needed value. On the other hand, when the ratio a/b is larger than 1.0. the initial counterforce exceeds a desired level.

Therefore, also in the second embodiment, the ratio a/b between the vertical and horizontal dimensions of the rib 24 is set in the range of from 0.2 to 1.0. In addition, the depth of projection of the rib 24 from the trim main body 1 is 50 mm, and the the thickness of a top end of the rib 24 is set at 1 to 1.2 mm.

Accordingly, smooth bellows-like buckling transformation of the rib 24 can be introduced by the rigidity changing portion P because this portion is formed at the location corresponding to the half wavelength of the buckling waveform of each rib side wall 24a. Namely, the initial counterforce on the buckling transformation can be desiredly reduced, and the buckling transformation itself can be well balanced and stabilized. Therefore, a non-linear ideal property can be obtained, thereby enhancing the collision energy absorption effect.

Further, each rigidity changing portion P is provided by integrally forming an auxiliary rib 25 with each rib side wall 24a over the site from its base end to the predetermined location described above. Therefore, the auxiliary rib 25 is also transformed with the buckling transformation of the rib 24, thereby increasing the amount of collision energy absorption.

In addition to the advantage on such a collision energy absorption property, the shape of rectangular tube rib 24 facilitates the release from the mold (not shown) on forming it with a resin. Moreover, since each rib side wall 24a is tapered with thinning toward its distal end to define a draw angle a of the mold (not shown) around its outer circumference, the release from the mold becomes easier, thereby enhancing the moldability and reducing the manufacturing cost.

In this embodiment, the shape of the auxiliary rib piece 25 is a triangle. However, it may be formed in a trapezoid as shown in FIG. 13 to make clear the effect of the rigidity changing portion P.

Figure 14:
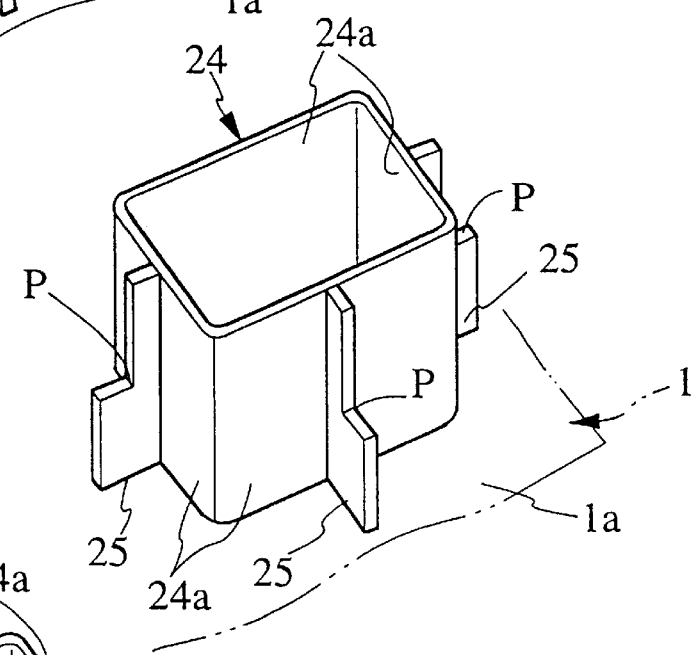
FIG. 14 is a perspective view showing an embodiment in which each auxiliary rib piece has a step.

FIG. 14 shows a modified example of the trapezoidal auxiliary rib piece 25, in which a step is formed in the intermediate portion of the oblique side of each auxiliary rib piece and the step is formed as the rigidity changing portion P. Thus, the entire rigidity of the rib structure can be increased by such modified pieces.

In this modified example, the auxiliary rib piece 25 is integrally formed with the outer face of each rib side wall 24a. However, it may be, optionally, formed integrally with the inner face of the rib side wall 24a.

Figure 13:
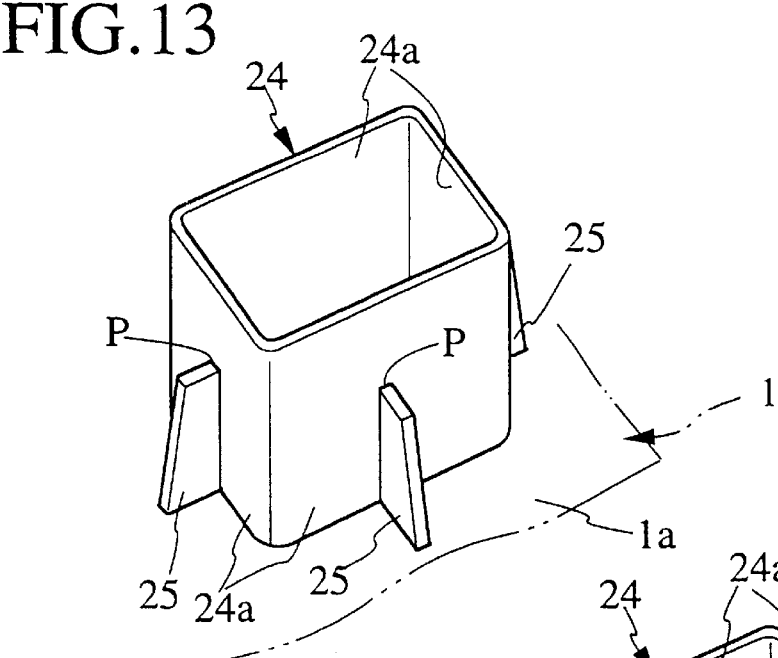
FIG. 13 is a perspective view showing an embodiment in which each auxiliary rib piece is formed in a trapezoid.
Figure 15:
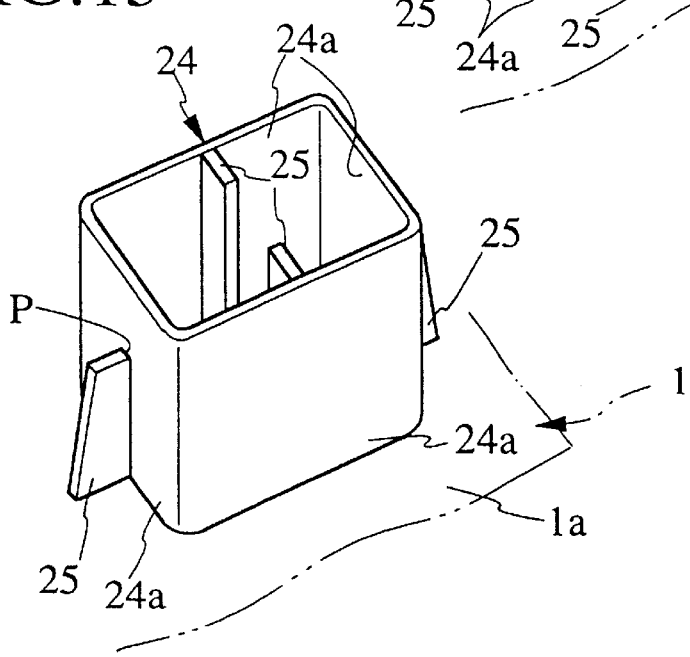
FIG. 15 is a perspective view showing an embodiment in which some auxiliary rib pieces are formed inside the rib side walls.

FIG. 15 shows a modified rib structure in which the trapezoidal auxiliary rib piece 25 as shown in FIG. 13 is integrally formed on the outer face of each vertically extending side wall 24a, and the stepped auxiliary rib piece 25 as shown in FIG. 14 is formed on the inner face of each horizontally extending side wall 24a.

Figure 9:
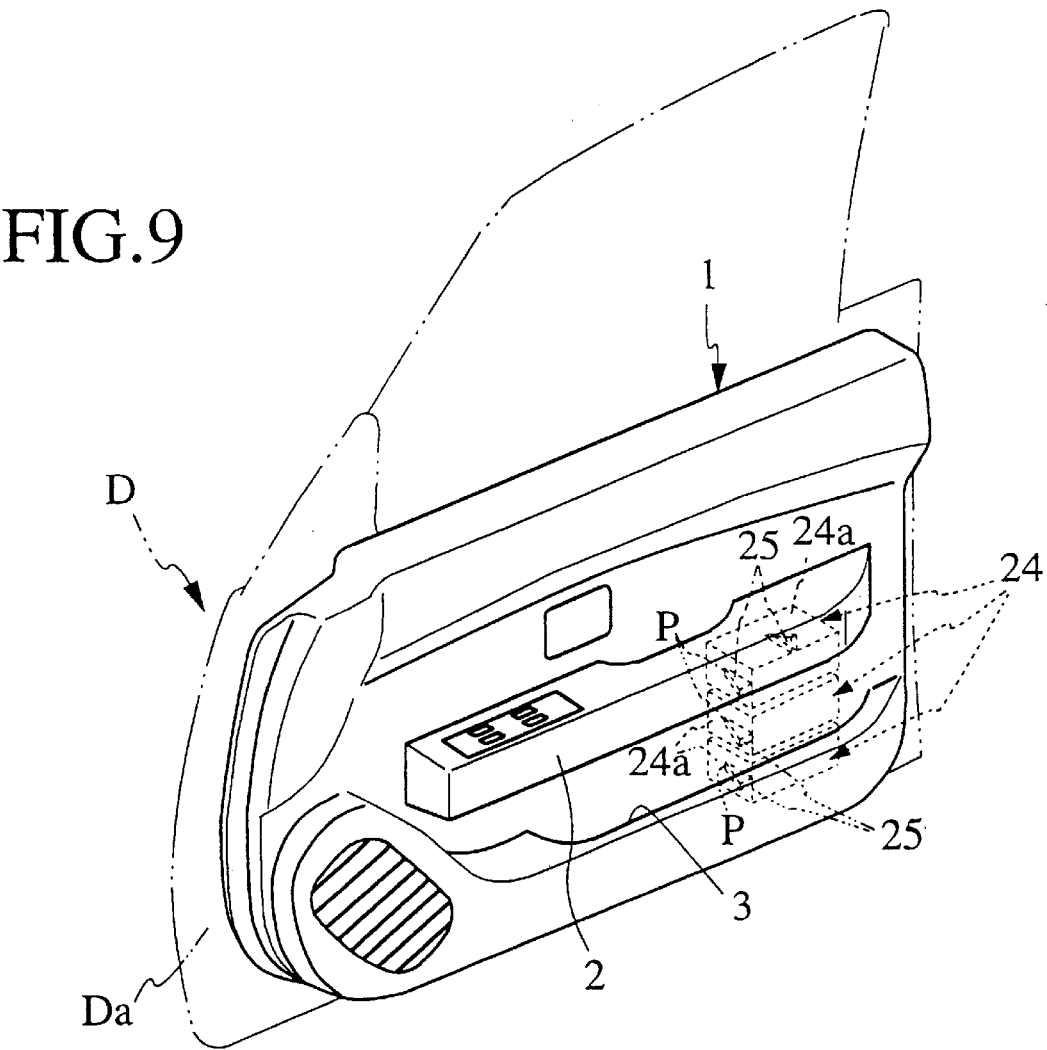
FIG. 9 is a perspective view showing a second embodiment of the present invention.
Figure 10:
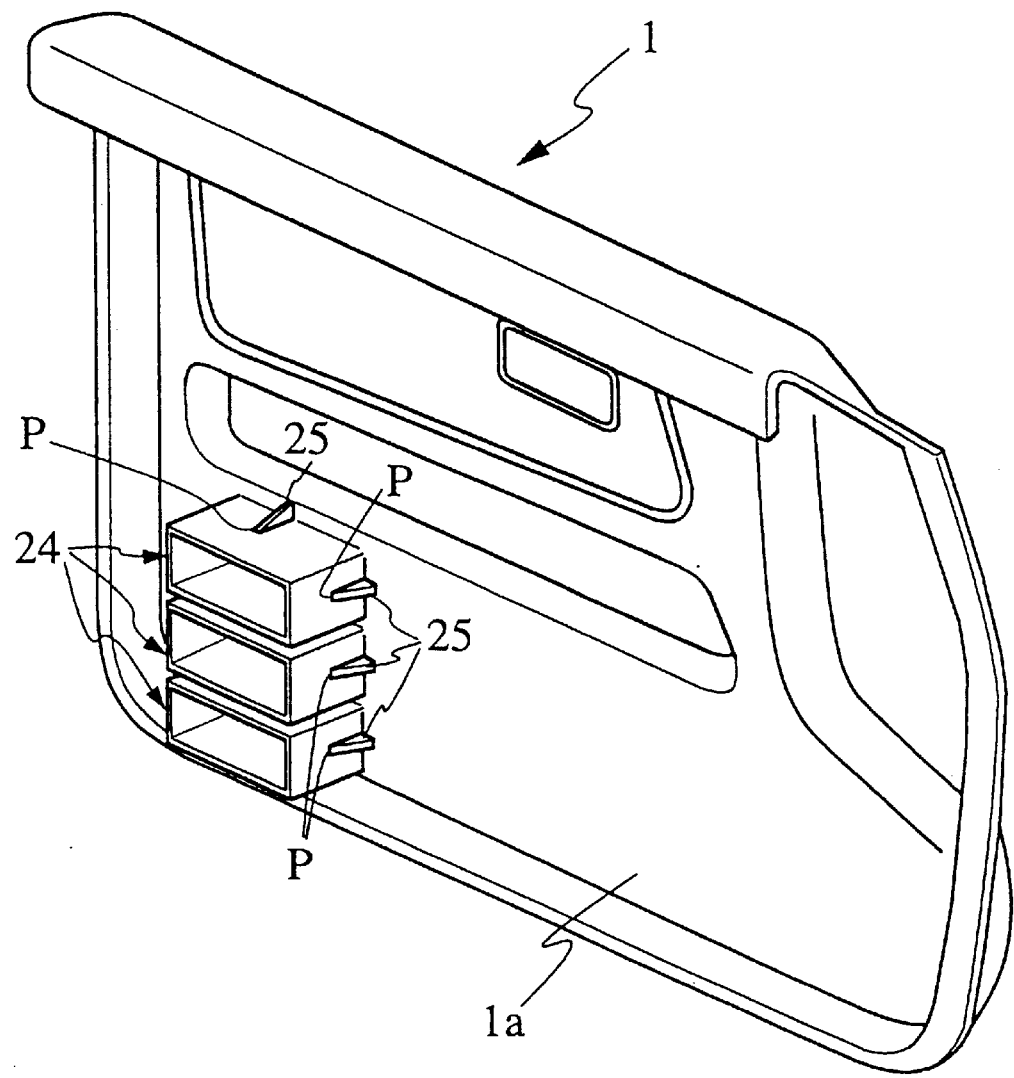
FIG. 10 is a perspective view showing the rear side of the trim main body of the embodiment shown in FIG. 9.
Figure 11:
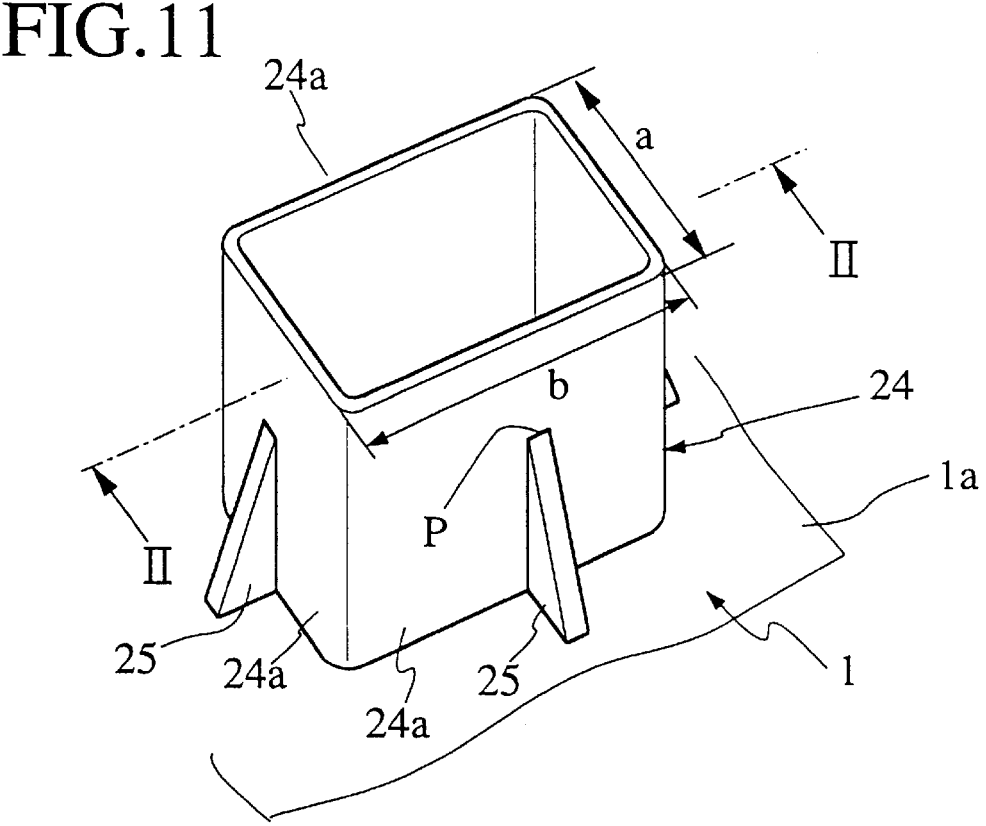
FIG. 11 is a perspective view showing a single rib to be provided on the rear side of the trim main body of the embodiment shown in FIG. 9.

This structure is advantageous in respect of space when a plurality of ribs 24 are arranged as shown in FIGS. 9, 10. Namely, the auxiliary rib piece 25 provided on the inner face of each rib side wall 24a does not interfere with the vertical arrangement of the ribs as shown in the same drawings.

In the embodiment described above, the plurality of ribs 24 are integrally formed with the rear face 1a of the trim main body 1. However, a plurality of ribs 24A may be prepared separately from the trim main body 1 as shown in FIG. 16. Namely, in the same drawing, the ribs 24A are formed integrally with a base plate 26 using a resin to be fixed through this plate 26 onto the rear face 1a of the trim main body 1 by screws or the like means.

According to this embodiment, since the trim main body 1 and ribs 24A are separated, the trim main body can be used in either application equipped or not equipped with the ribs.

FIGS. 17 and 18 show two embodiments in either of which a plurality of triangular tube ribs 4B are integrally formed in contact with each other. Similarly, in these embodiments, the ratio and the maximum value of the vertical and horizontal dimensions of each rib are set at the respective ranges desribed above with reference to FIG. 3.

In the embodiment shown in FIG. 17, partition walls 28, 28 are integrally formed with and between a pair of side walls to form three continuous ribs 24B vertically arranged.

In this embodiment, since each ajacent pair of these ribs 24B commonly use the partition wall 28, the absorption amount of collision energy is more reduced as compared to the embodiments shown in FIGS. 9 and 10. However, the design of the forming mold and the release from the mold can be more facilitated on arranging the plurality of ribs at a predetermined area on the rear face of the trim main body 1.

In the embodiment shown in FIG. 18, the partition walls 28, 28 vertically intersecting each other are integrally formed with and between each facing pair of the outer side walls to define four gathering ribs 4B.

At the intersecting point of these partition walls 28, 28, boss 28a is formed to facilitate the release from the mold.

Similar to the embodiment of FIG. 17, since each ajacent pair of these ribs 24B commonly use the partition wall 28, the absorption amount of collision energy is more reduced as compared to the embodiments shown in FIGS. 9 and 10. However, it becomes easier to form and arrange such a plurality of ribs 24B contacting with each other as shown in FIG. 18 at a predetermined area on the rear face of the trim main body 1.

Figure 19:
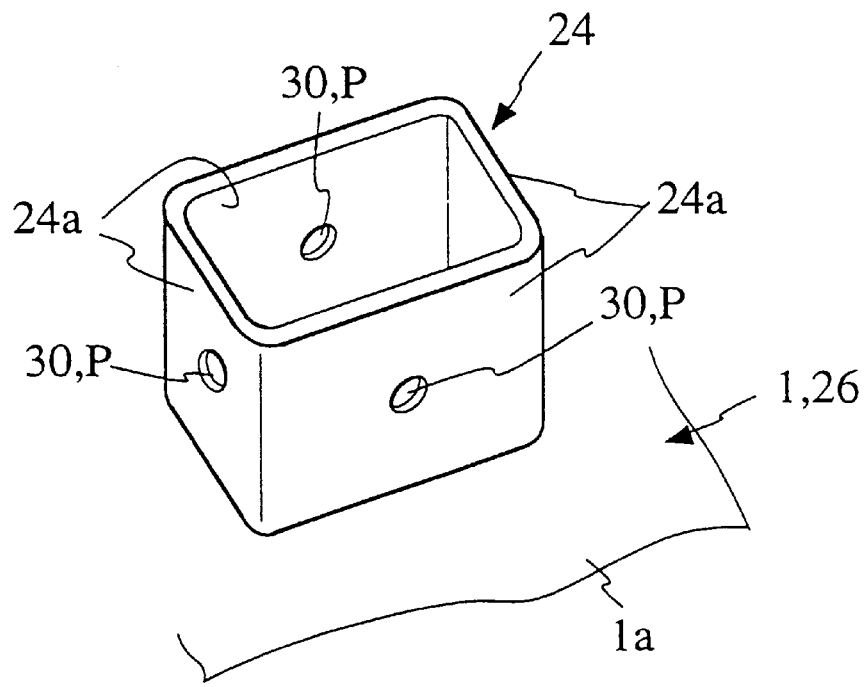
FIG. 19 is a perspective view showing an embodiment in which an opening formed in each side wall is used as the rigidity changing portion.

FIG. 19 shows another example of the rigidity changing portion P. In this embodiment, an opening 30 is provided as the rigidity changing portion P in each rib side wall 24a at the predetermined location described above with reference to FIG. 11.

Accordingly, when the driver is moved aside in the compartment on a side collision or the like reason and his or her body hits on the trim main body 1, the bellows-like buckling transformation of the rib 24 is introduced by the rigidity changing portion P. Thus, smooth buckling transformation can be introduced through that rigidity changing portion, thereby absorbing the energy of collision and safely protecting the driver.

Since the opening 30 formed at a predetermined location in each rib side wall 24a is used as the rigidity changing portion P, this construction is more advantageous on the manufacturing cost than the case in which the auxiliary rib piece 25 is formed integrally with the side wall.

Figure 20:
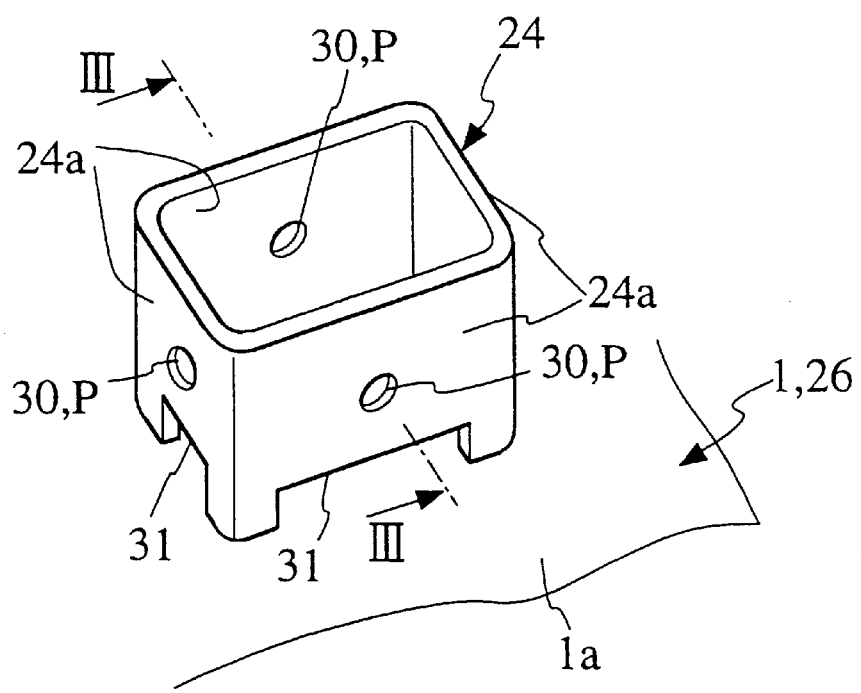
FIG. 20 is a perspective view showing an embodiment in which an opening and a base end slit formed in each side wall are used as the rigidity changing portion.
Figure 21:
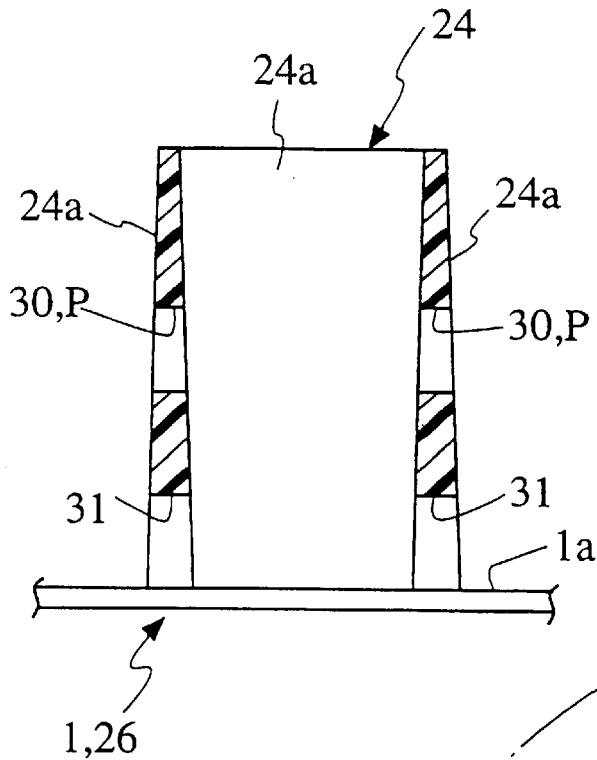
FIG. 21 is a cross-section taken along the line III—III of FIG. 20.

FIGS. 20 and 21 respectively show another embodiment in which a slit 31 is formed near the forming base of each side wall 24a with the opening 30 as the rigidity changing portion P being formed at the predetermined location in the rib side wall 24a.

In addition to the above-described effect of tapered rib side wall 24a, the buckling transformation can be more smoothly performed because the slit 31 is provided near the forming base portion of each rib side wall 24a which is thicker than the distal portion thereof. Therefore, desired reduction of the initial counterforce can be obtained on the buckling transformation.

It should be understood that this slit can be also applied to the embodiments shown in FIGS. 9 to 18.

Next, the third embodiment of the present invention will be described with reference to the drawings in which like reference numerals designate like parts in the first embodiment, respectively.

Figure 22:
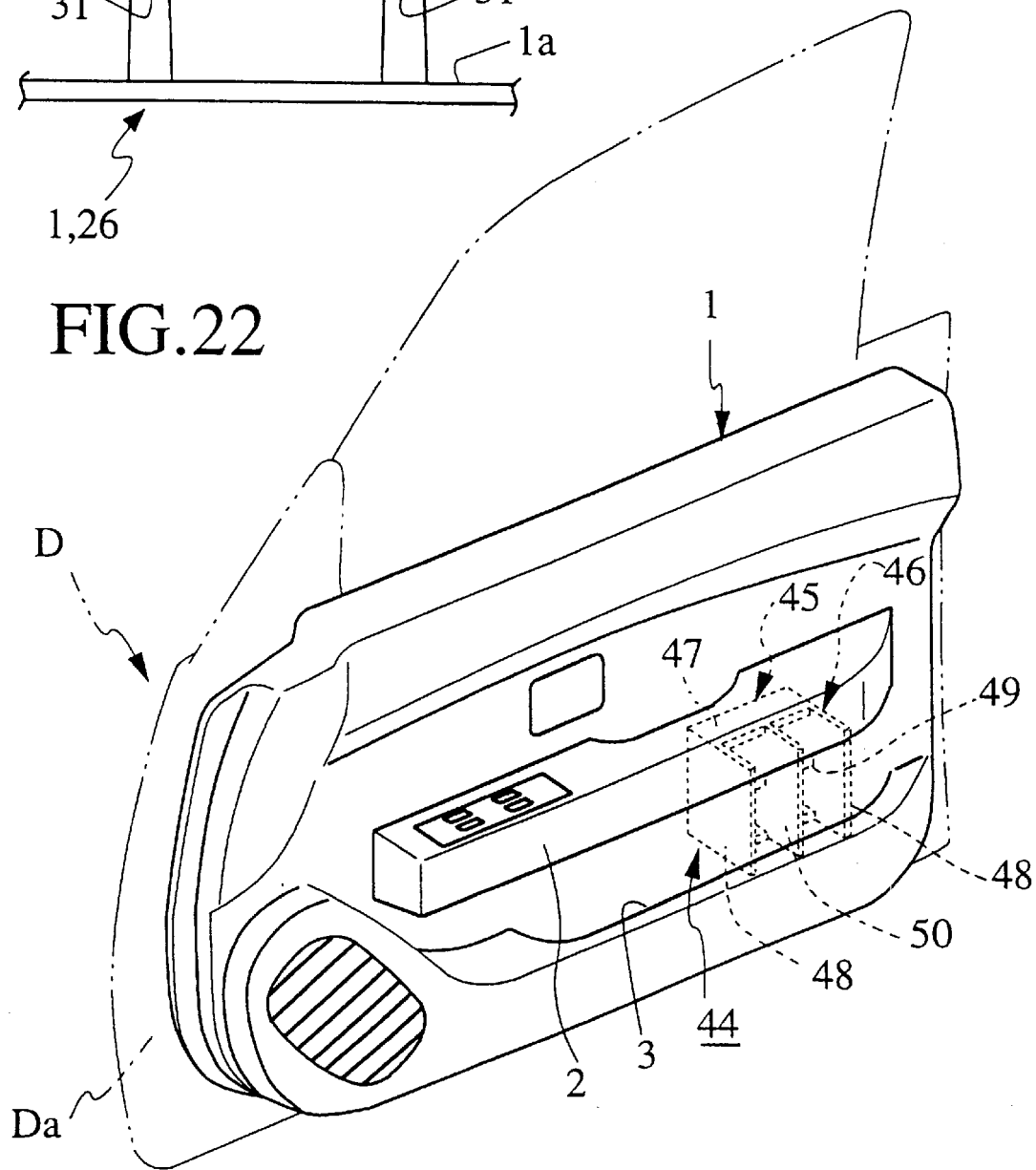
FIG. 22 is a perspective view of a trim main body as third embodiment of the present invention.
Figure 23:
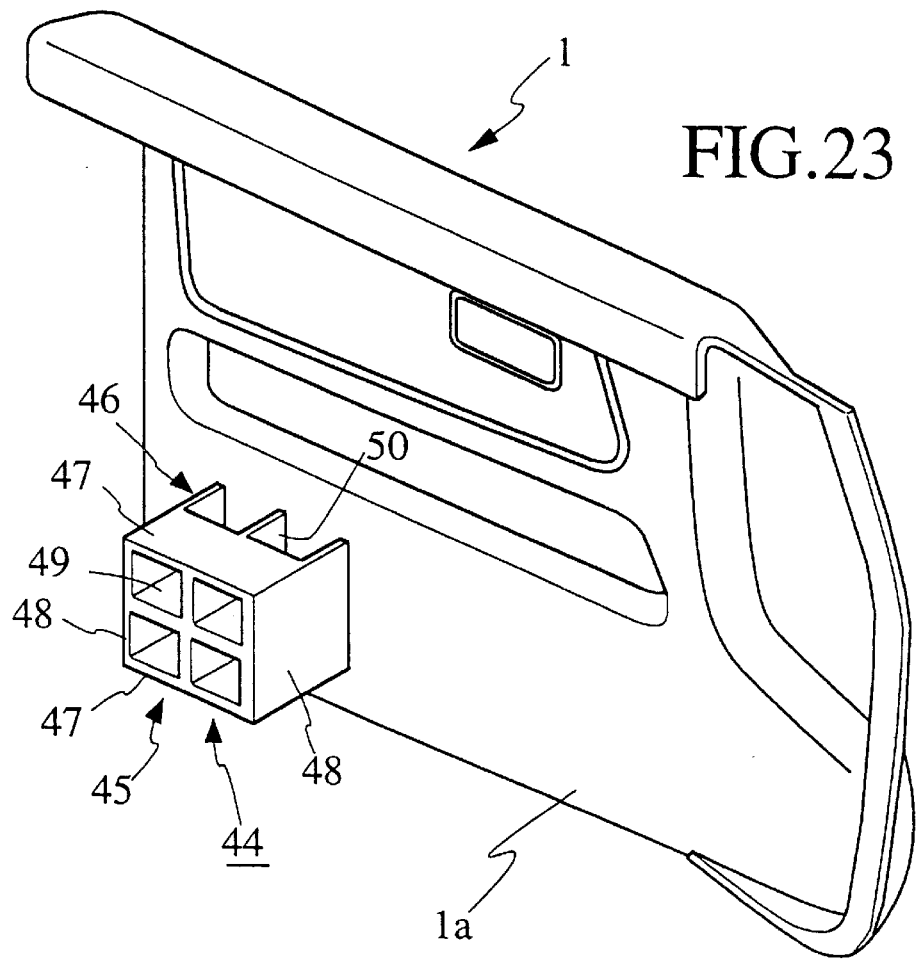
FIG. 23 is a perspective view of the rear side of the trim main body in the third embodiment of this invention.
Figure 24:
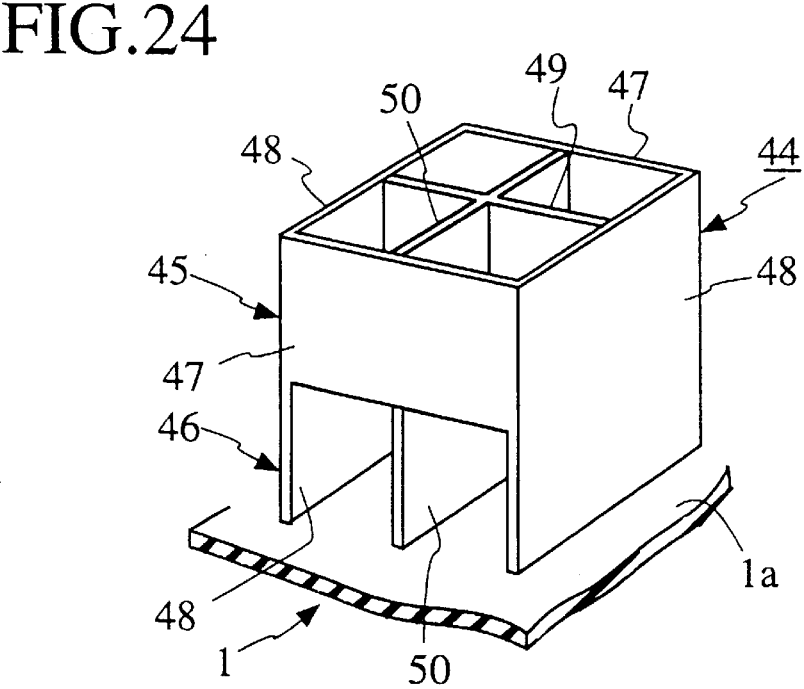
FIG. 24 is an enlarged perspective view of the rib structure in the third embodiment of this invention.

FIGS. 22 to 24 respectively show rib 44 formed on the rear face 1a of trim main body 1.

The rib 44 is formed generally in a rectangular tube and includes front and rear portions having different numbers of rib walls to define first energy absorbing portion 45 and second energy absorbing portion 46, respectively.

The first energy absorbing portion 45 includes horizontal rib side walls 47, 47, vertical rib side walls 48, 48 and two partition rib walls 49, 50 vertically intersecting each other between each facing pair of these side walls 47, 47, 48, 48. The second energy absorbing portion 46 is constructed using only the vertical rib side walls 48, 48 and the partition rib wall 50 which is parallel to these side walls 48, 48.

Namely, the second energy absorbing portion 46 can be easily formed integrally with the first energy absorbing portion 45 using a slide mold.

According to this embodiment, when the driver is moved aside by the inertia force on a side collision or the like case and his or her body hits on the door inner panel Da of trim main body 1, the load of collision acts along the axial direction of rib 44. Thus, the rib 44 is transformed with buckling between the trim main body 1 and the door inner panel Da to absorb the collision energy.

Because the rib 44 is formed generally in a rectangular tube, smooth bellows-like buckling transformation by the load of collision along the axial direction can suppress the initial counterforce on that transformation and absorb the collision energy with high efficiency.

Additionally, the collision energy absorption amount differs from the first energy absorbing portion 45 to the second energy absorbing portion 46 because the former portion 45 includes a greater number of rib side walls and the latter portion 46 includes a smaller number of rib side walls. Namely, the total energy absorption amount can be adjusted by changing the number of rib side walls defining each energy absorbing portion.

Further, the second energy absorbing portion 46 may be formed with a slide mold (not shown) changing the thickness of the rib side walls 48, 48 and 50 to the thickness of the first energy absorbing portion 45. Therefore, the adjustment of the collision energy absorption amount can be more facilitated.

In addition to the advantage on that collision energy absorption property, the moldability of trim main body 1 in case of integrally forming the rib 44 with the rear face 1a of trim main body 1 is maintained in a good condition because the shape of rectangular tube rib 44 can facilitate the release from the mold. Further, the so enhanced moldability can reduce the manufacturing cost.

Also, the smooth buckling transformation due to the rib 44 can assure a sufficient effective stroke of transformation. Therefore, the height of projection from the rear face of trim main body 1 can be suppressed, thereby guaranteeing a desiredly wide compartment space.

In this embodiment, the rib 44 is integrally formed with the rear face of trim main body 1. However, it may be formed integrally with a base plate 51 using a resin as shown in FIG. 25 and then fixed to the rear face 1a of trim main body 1 through the base plate 51 with screws 52 or the like means.

Figure 25:
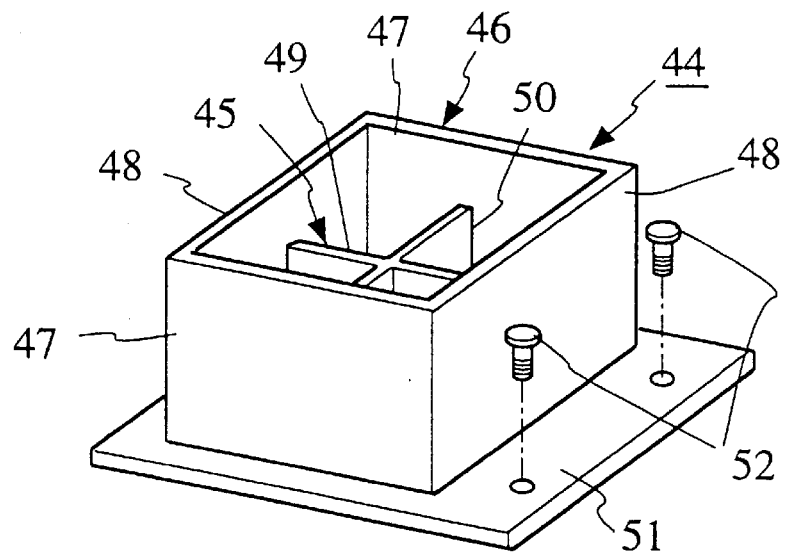
FIG. 25 is a perspective view showing an embodiment in which the rib structure is formed separately from the trim main body.

In the rib 44 shown in FIG. 25, the first energy absorbing portion 45 including partition walls 49, 50 is disposed near the base plate 51, while the second energy absorbing portion 46 with a shape of simple rectangular tube is provided in front of the first portion 45. However, the front and rear positions of these first and second energy absorbing portions 45, 46 and the number of the rib side wall included in each portion may be changed optionally depending on the needed collision energy absorption property.

That separate formation of the trim main body 1 and the rib 44 permits the trim main body 1 to be applied to either case equipped or not equipped with the rib.

Figure 26:
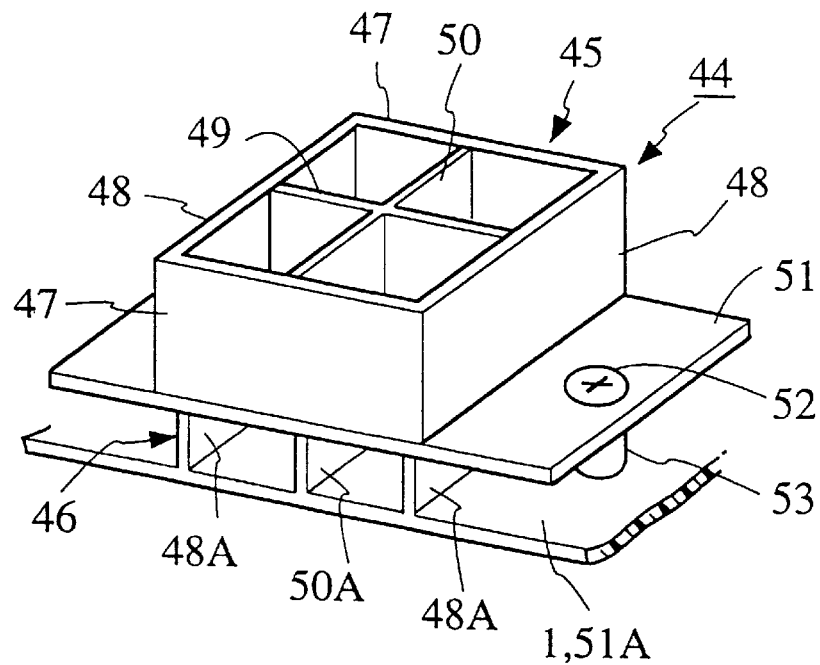
FIG. 26 is a perspective view showing an embodiment in which first and second energy absorbing sites are formed separately.

FIG. 26 shows an example in which the first and second energy absorbing portions 45, 46 are formed separately.

Specifically, the first energy absorbing portion 45 is formed integrally with the base plate 51, including partition walls 49, 50 vertically intersecting between each facing pair of the rib side walls. The second energy absorbing portion 46 is formed with the rear face of trim main body 1, including rib walls 48A, 48A, 50A respectively corresponding to the rib side walls 48, 48 and partition wall 50 of the first energy absorbing portion 45.

Further, the first energy absorbing portion 45 is fixed to the rear face 1a of trim main body 1 through the base plate 51 by engaging screws 52 with corresponding boss portions 53 formed in the rear face 1a.

Accordingly, by such separate formation of the first and second energy absorbing portions 45 and 46, these members can be easily obtained.

In this embodiment, the second energy absorbing portion 46 is integrally formed with the rear face 1a of trim main body 1. This portion 46 may be formed separately from the trim main body 1.

Also in this embodiment, only one rib 44 formed in a rectangular tube is provided on a needed area of the rear face 1a of trim main body 1. A plurality of rib 44 may be arranged as described above to increase the collision energy absorption amount.

Next, the fourth embodiment will be described. Also in the following description, like parts in the first embodiment are designated by like reference numerals, respectively.

Figure 27:
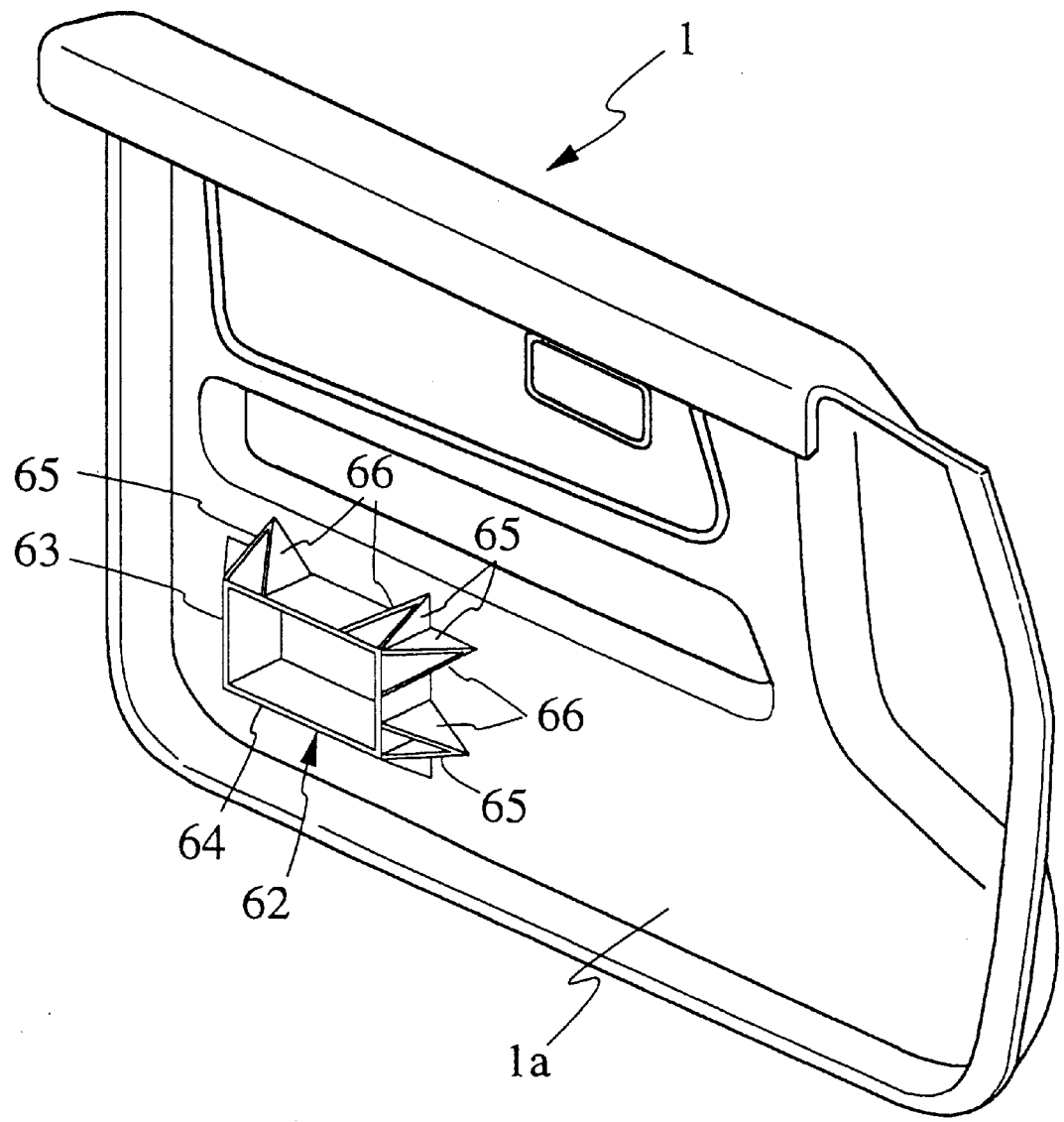
FIG. 27 is a perspective view showing the rear side of a trim main body as fourth embodiment of the present invention.
Figure 28:
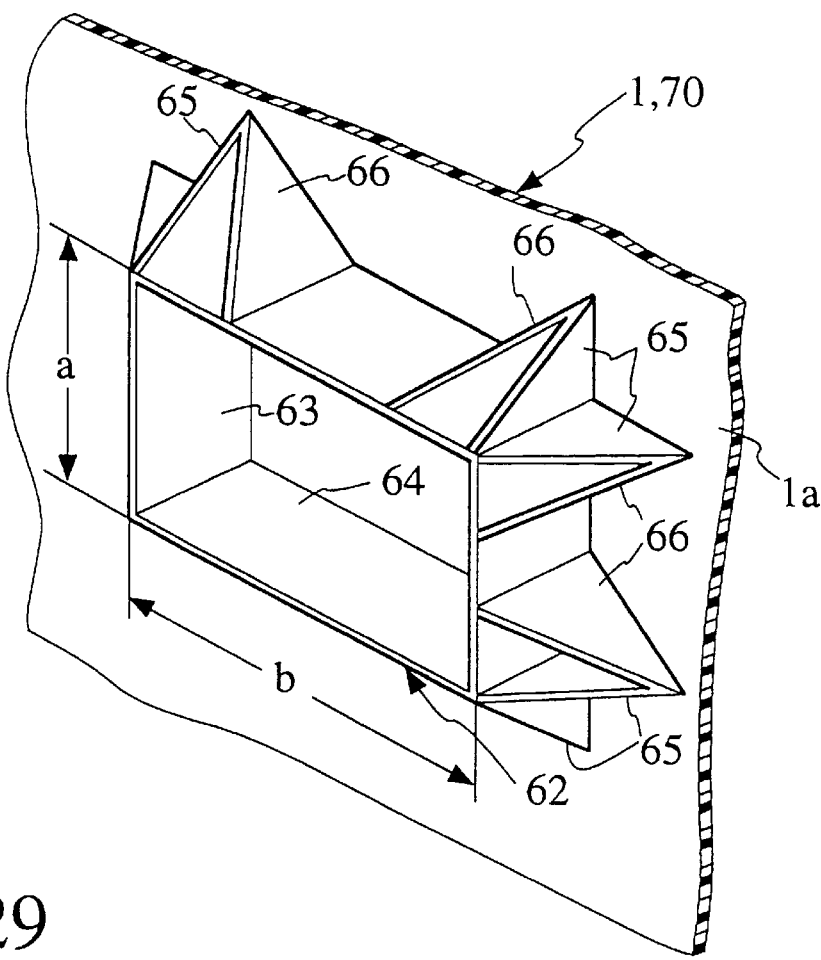
FIG. 28 is an enlarged perspective view showing an important portion in the fourth embodiment.

FIGS. 27 and 28 show rib 62 formed on the rear face 1a of trim main body 1.

As shown in the same drawings, first and second auxiliary rib pieces 65, 66 are formed integrally outside each corner of the rib 66.

The first auxiliary rib piece 65 extends along each of vertical and horizontal side walls 63, 64 from its end. The second auxiliary rib piece 66 is integrally formed between the distal end of each first auxiliary rib piece 65 and a predetermined location of side wall 63 or 64 vertical to that first auxiliary rib piece 65.

In this embodiment, each of the first and second auxiliary rib pieces 65, 66 is formed in a triangle. However, these parts may have a rectangular shape.

Figure 29:
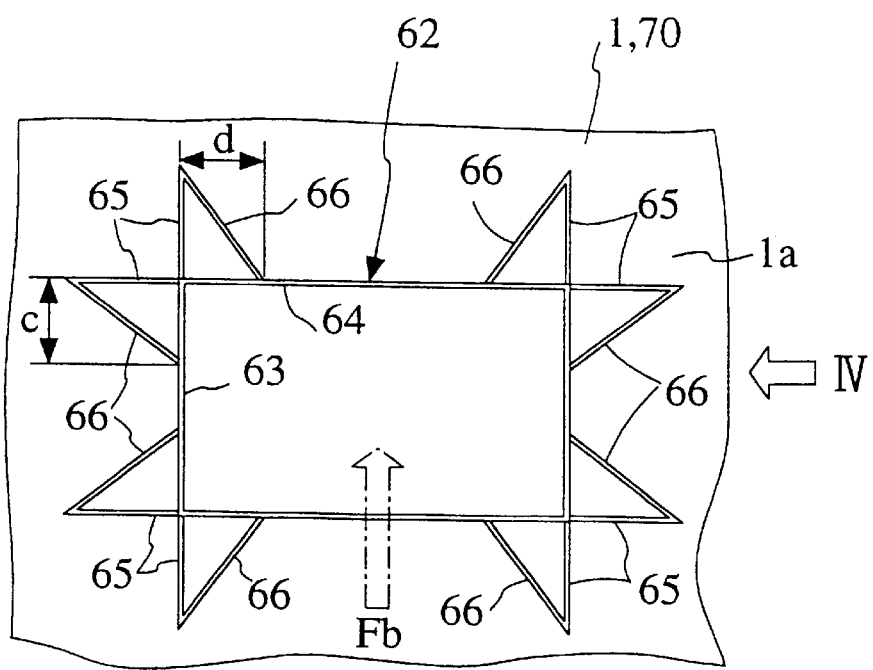
FIG. 29 is a side elevation of the rib structure in the fourth embodiment.

It is preferred that distances c, d shown in FIG. 29 between the predetermined location and each corner of the vertical and horizontal side walls 63, 64 establish $c \geq a1/3$, $d \geq b1/3$ when the dimensions of these vertical and horizontal side walls 63, 64 are a, b, respectively. It is further preferred to set the ratio a/b within the range of 0.2 to 1.0. Namely, if the ratio a/b is set in that range, the initial counterforce on the buckling transformation can be suppressed low and a sufficient amount of collision energy absorption can be obtained.

According to this embodiment, when the driver is moved aside by the inertia force on a side collision or the like case and his or her body hits on the door inner panel Da of trim main body 1, the rib 62 is transformed with buckling between the trim main body 1 and the door inner panel Da to absorb the collision energy.

Figure 30:
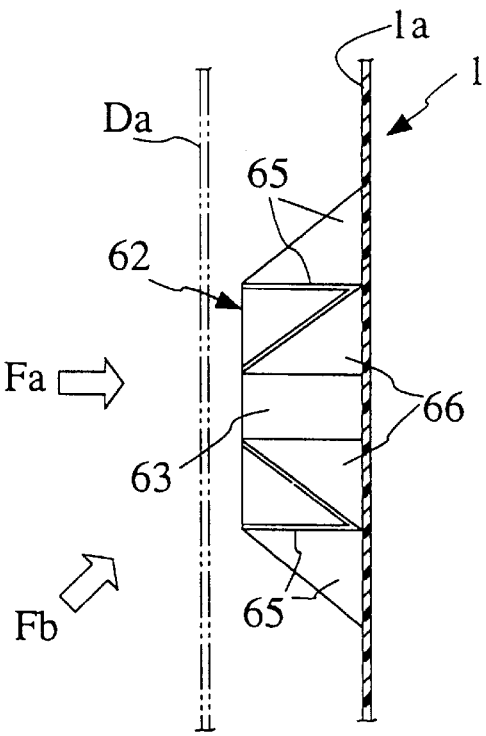
FIG. 30 is a view seen along the direction of arrow IV of FIG. 29.

Namely, when the load of collision is applied to the rib 62 in the direction denoted by arrow Fa as shown in FIG. 30, the smooth bellows-like buckling transformation due to the rectangular tube rib 62 for absorbing the collision energy can suppress the initial counterforce. Further, the first and second auxiliary rib pieces 65, 66 are also transformed with buckling along with the rib 62. Therefore, the collision energy is absorbed by all the effects of buckling transformation due to the rib 62 and the first and second auxiliary rib pieces 65, 66.

Alternatively, when the load of collision is obliquely applied to the rib 62 in the direction denoted by arrow Fb, the side walls vertical to that direction, i.e. horizontal side walls 64, 64, tend to fall. However, the first and second auxiliary rib pieces 65, 66 will suppress the falling of these side walls 64, 64 on such a case.

Accordingly, a desired energy absorption property can be obtained on either case of collision load applied in the axial or an oblieque direction, thereby protecting the driver safely.

Figure 31:
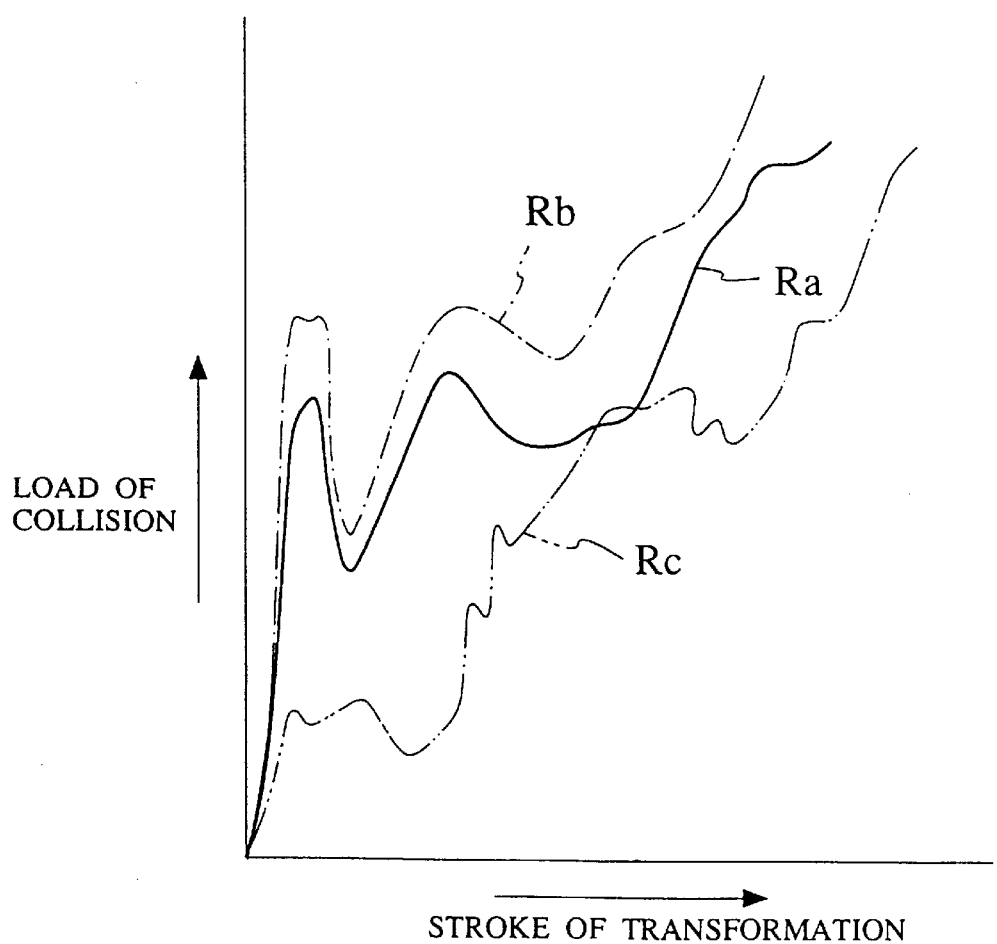
FIG. 31 is a diagram showing the collision energy absorption property of the rib structure.

In FIG. 31, curve Ra designates the collision energy absorption property where the load of collision is obliquely applied to the rib provided with the first and second auxiliary rib pieces. Curves Rb and Rc designate the collision energy absorption properties where the load of collision is applied along the axial and an any given oblieque directions to the rib without any of the first and second auxiliary rib pieces, respectively. As is seen from the same drawing, when compared to the case of Rb, the enegy absorption property of Rc is significantly degraded due to the aforementioned falling tendency of the rib. In the case of Ra, however, the first and second auxiliary rib pieces permit the collision energy apsorption property even in the case of obliquely applying the collision load to get near the desired property in the case of applying the load along the axial direction.

In addition to the advantage on the collision energy absorption property, the shape of rectangular tube rib 62 facilitates the release from the mold on forming the rib 62 integrally with the rear face 1*a* of trim main body 1. Therefore, the moldability can be enhanced, reducing the manufacturing cost.

As described above, the rib 62 can also assure a sufficient effective stroke of transformation due to its smooth buckling transformation. Thus, the height of projection from the rear face 1*a* of trim main body can be desiredly suppressed, thereby presenting a wide compartment space.

In this embodiment, the rib 62 is formed integrally with the rear face of trim main body 1. However, the rib 62 may be formed separately from the trim main body 1 and fixed to the rear face 1*a* through a suitable member.

For example, in FIGS. 28, 29, the trim main body 1 may be replaced by base plate 70 formed with a resin. Thus, the rib 64 and first and second auxiliary rib pieces 65, 66 are formed integrally with the base plate 70.

Because the rib 62 can be separated from the trim main body 1 in this case, that trim main body 1 can be used in either application equipped or not equipped with the rib.

Further, in this embodiment, the single rib 62 is provided on a predetermined site of the rear face of trim main body 1. However, a plurality of ribs 62 may be arranged collectively on that site to increase the collision energy absorption amount.

As stated above, the following effects can be obtained by the present invention.

Since the rib is formed in a rectangular tube, when it receives some load applied along its axial direction on a side collision or the like case, it can be smoothly transformed with bellows-like buckling, thereby suppressing the initial counter fource on the transformation and absorbing the collision energy to safely protect the driver.

The shape of the rectangular tube rib facilitates the release from the mold on forming it with a resin, thereby enhancing the moldability and reducing the manufacturing cost.

The smooth buckling transformation due to the rectangular tube rib can assure a sufficient effective stroke of transformation. Accordingly, the height of projection from the rear face of the trim main body can be suppressed to a relatively small value, thereby guaranteeing a wide compartment space.

Since the rigidity changing portion for introducing the rib buckling transformation is disposed at a predetermined location of each rib side wall, when the rib receives some load applied along its axial direction on a side collision or the like case, the rigidity changing portion gives the rib smoother bellows-like buckling. Accordingly, the initial counter fource and fluctuation on the buckling transformation can be more reduced, thereby obtaining an ideal non-linear property of collision energy absorption to safely protect the driver.

By integrally forming the rib on the rear face of the resinous trim main body, the number of parts, processes for managing them and manufacturing cost can be reduced.

When the rib is integrally formed with the trim main body, the releasability from the mold due to the rectangular tube rib does not affect the moldability of the trim main body.

By integrally forming the rib with a base plate to fix it onto the rear face of the trim main body through the base plate, the trim main body can be used in either application equipped or not equipped with the rib.

By arranging a plurality of ribs at a predetermined interval on the rear face of the trim main body, these ribs can cooperatively absorb the collision energy thereby to enhance the effect of absorption.

Since the plurality of ribs are arranged at a predetermined interval, each rib can perform smooth bellows-like buckling transformation without any interaction to each other. Therefore, a sufficient effective stroke can be assured, and an excellent collision energy absorption property can be obtained.

In that arrangement of plural ribs at a predetermined interval, the buckling transformation mode of each rib can be changed so that the optimum collision energy absorption property can be obtained by easy adjustment thereof.

By interposing partition walls between a facing pair of side walls of a single rectangular tube rib, the forming of plural ribs can be more facilitated on the rear face of the trim main body can be more facilitated.

By interposing partition walls between two facing pairs of side walls of a single rectangular tube rib, the forming of plural ribs vertically and horizontally connected to each other can be more facilitated on the rear face of the trim main body.

By forming each side wall of the rectangular tube rib tapered and thinning toward its distal end, a desired draw angle can be obtained, thereby further enhancing the moldability.

Also, by forming each side wall of the rectangular tube rib tapered and thinning toward its distal end, the buckling transformation of the rib starts at its thinnest distal end. Therefore, the initial counter force can be reduced low to provide smooth transformation. Further, non-linear ideal transformation mode can be obtained, thereby enhancing the collision energy absorption effect.

The driver can be safely protected by setting the ratio of the vertical dimension a and horizontal dimension b of the rectangular rib within the range from 0.2 to 1.0, which provides sufficient collision energy absorption.

The driver can be safely protected by setting the maximum value of the vertical and horizontal dimensions a, b of the rectangular rib at 70 mm or less, which is the optimum value for the collision energy absorption and layout property on arranging plural ribs collectively.

By forming the rigidity changing portion on the rib side wall at the location corresponding to the half wavelength of buckling transformation of the rib, the bellows-like buckling transformation can be smoothly started and completed, and the collision energy absorption effect can be further enhanced.

By constructing the rigidity changing portion by forming the auxiliary rib piece integrally with the rib side wall, the buckling transformation of the rib can be introduced with certainty by that rigidity changing portion.

Because the auxiliary rib piece is transformed with the buckling transformation of the rib, the amount of collision energy absorption can be increased.

The efficiency of space and the degree of freedom for the layout can be enhanced by forming the auxiliary rib piece integrally with the inner face of the rib side wall to avoide interference of the auxiliary rib piece to the arrangement of the rib structure on the rear face of trim main body.

By constructing the rigidity changing portion by forming an opening in the rib side wall, the moldability can be further enhanced to reduce the manufacturing cost.

In addition to the effect of the tapered distal end of the rib side wall, the slit provided near the thicker base end portion of the rib side wall can reduce the rigidity of that portion, thereby providing further smooth buckling transformation of the rib entire body and more reduced initial counter force on the buckling transformation.

By forming the first and second energy absorbing portions, one having a different number of ribs from the other's, in a multi-stepped construction, the amount of collision energy absorption can be adjusted optionally to obtain the optimum collision energy absorption property.

By separately forming the first and second energy absorbing portions, the moldability can be further enhanced, and the adjustment of collision energy absorption can be performed more easily.

By the cooperative effect of the first auxiliary rib piece extending outside from each corner of the rectangular tube rib and the second auxiliary rib piece extending from the distal end of first auxiliary rib piece onto the side wall vertically intersecting that first auxiliary rib piece, an excellent collision energy absorption property can be obtained even in the case of collision load applied obliquely to the axis of the rib structure.

What is claimed is:

1. An energy absorbing car trim for attaching to a panel face of a side portion of a car compartment adjacent to a driver or passenger seat, comprising:
    a trim main body; and
    at least one rectangularly-shaped tubular rib formed with the trim body said at least one rib having a rigidity changing portion formed on each side wall thereof at a location corresponding to a half wavelength of buckling waveform thereof, between a distal end of each at least one rib and a base of said at least one rib to introduce controlled buckling transformation for the rib.

2. An energy absorbing car trim of claim 1, further including a base plate formed integrally with said at least one rib and fixed to the trim main body.

3. An energy absorbing car trim of claim 1, wherein each of the side walls of said at least one rib is tapered, thinning toward its distal end.

4. An energy absorbing car trim of claim 1, wherein a height to width ratio of said at least one rib ranges from 0.2 to 1.0.

5. An energy absorbing car trim of claim 1, wherein a maximum depth or length of said at least one rib is 70 mm or less.

6. An energy absorbing car trim of claim 1, wherein the rigidity changing portion is constructed on each of the side walls of said at least one rib by an auxiliary rib piece extending from a base to a predetermined depth of each side wall.

7. An energy absorbing car trim of claim 6, wherein the auxiliary rib piece is formed integrally on four inner faces of the four side walls of said at least one rib.

8. An energy absorbing car trim of claim 1, wherein the rigidity changing portion comprises an opening in each of the side walls of said at least one rib.

9. An energy absorbing car trim of claim 1, wherein a slit is formed near a base portion of each of the side walls of said at least one rib.

10. An energy absorbing car trim of claim 1, wherein said at least one rib includes a first energy absorbing portion at its base portion and a second energy absorbing portion at its distal portion, the number of walls included in the first energy absorbing portion being different from the number of walls included in the second energy absorbing portion.

11. An energy absorbing car trim of claim 10, wherein the first and second energy absorbing portions are connected to each other to form the rib.

12. An energy absorbing car trim of claim 1, further comprising a first auxiliary rib piece extending outside from each corner along one side wall of said at least one rib and a second auxiliary rib piece extending from the distal end of the first auxiliary rib piece onto the other side wall intersecting the first auxiliary rib piece, wherein the first and second auxiliary rib pieces are integrally formed with said at least one rib.

13. An energy absorbing car trim for attaching to a panel face of a side portion of a car component adjacent seat, comprising:
    a trim main body having a first side facing toward the seat and a second side opposite the first side, the second side being subject to an impact energy;
    a generally tubular rib extending from the second side and terminating with a distal open end facing in a direction opposite the seat, wherein the tubular rib has four side walls mounted to the trim main body to define a generally rectangular cross-section;
    a plurality of rigidity changing portion formed on the side walls, the rigidity changing portions being each located at a predetermined location remote from the distal end by a distance between $(a+b)/8$ and $3(a+b)/8$, where a and b represent a length and width of the rectangular cross section, respectively, so as to introduce controlled buckling transformations about the rigidity changing portions.

14. An energy absorbing car trim according to claim 13, wherein the plurality of rigidity changing portion is constructed on each side wall by integrally forming an auxiliary rib piece extending over a portion from a base to the predetermined location.

15. An energy absorbing car trim according to claim 14, wherein each side wall is tapered, thinning toward its distal end.

16. An energy absorbing car trim according to claim 13, wherein the rigidity changing portion comprises an opening in the side wall.

17. An energy absorbing car trim according to claim 15, further including a plurality of tubular ribs mounted to the trim main body, the ribs being spaced apart from each other at a predetermined interval.

18. An energy absorbing car trim according to claim 17, wherein the trim main body is a door trim body and the side portion is a door inner panel, respectively, and wherein the plurality of tubular ribs extend between the door inner panel and the door trim with each rib extending substantially perpendicular to the door inner panel.

* * * * *

UNITED STATES PATENT AND TRADEMARK OFFICE
CERTIFICATE OF CORRECTION

PATENT NO. : 6,036,251
DATED : March 14, 2000
INVENTOR(S) : Fumio YAGISHITA

It is certified that error appears in the above-indentified patent and that said Letters Patent is hereby corrected as shown below:

On the title page item [30], change "1998" to --1994--

Signed and Sealed this

Third Day of April, 2001

*Attest:*

NICHOLAS P. GODICI

*Attesting Officer*  Acting Director of the United States Patent and Trademark Office